INVENTORS
SHELDON LEE PASTOR
CARL W. CLARAS
ROBERT L. MOORE
RUDOLPH A. ROM
MYRON ZARR
BY
Carpenter, Abbott, Coulter & Kinney
ATTORNEYS

SELF-THREADING MAGNETIC TAPE RECORDING AND REPRODUCING APPARATUS

Filed May 8, 1961 10 Sheets-Sheet 2

INVENTORS
SHELDON LEE PASTOR
CARL W. CLARAS
ROBERT L. MOORE
RUDOLPH A. ROM
MYRON ZARR
BY Carpenter Abbott Coulter & Kinney
ATTORNEYS INVENTORS
SHELDON LEE PASTOR
CARL W. CLARAS
ROBERT L. MOORE
RUDOLPH A. ROM
MYRON ZARR
BY
Carpenter Abbott Coulter & Kinney
ATTORNEYS Sept. 22, 1964 S. L. PASTOR ET AL 3,149,797

SELF-THREADING MAGNETIC TAPE RECORDING AND REPRODUCING APPARATUS

Filed May 8, 1961 10 Sheets-Sheet 4

INVENTORS
SHELDON LEE PASTOR
CARL W. CLARAS
ROBERT L. MOORE
RUDOLPH A. ROM
MYRON ZARR

BY

Carpenter Abbott Coulter & Kinney
ATTORNEYS

SELF-THREADING MAGNETIC TAPE RECORDING AND REPRODUCING APPARATUS

Filed May 8, 1961

INVENTORS
SHELDON LEE PASTOR
CARL W. CLARAS
ROBERT L. MOORE
RUDOLPH A. ROM
MYRON ZARR
BY
Carpenter Abbott Coulter & Kinney
ATTORNEYS

SELF-THREADING MAGNETIC TAPE RECORDING AND REPRODUCING APPARATUS

Filed May 8, 1961 10 Sheets-Sheet 6

INVENTORS
SHELDON LEE PASTOR
CARL W. CLARAS
ROBERT L. MOORE
RUDOLPH A. ROM
MYRON ZARR

BY
Carpenter Abbott Coulter & Kinney
ATTORNEYS

SELF-THREADING MAGNETIC TAPE RECORDING AND REPRODUCING APPARATUS

Filed May 8, 1961 10 Sheets-Sheet 7

INVENTORS
SHELDON LEE PASTOR
CARL W. CLARAS
ROBERT L. MOORE
RUDOLPH A. ROM
MYRON ZARR
BY
Carpenter Abbott Coulter & Kinney
ATTORNEYS

SELF-THREADING MAGNETIC TAPE RECORDING AND REPRODUCING APPARATUS

Filed May 8, 1961 10 Sheets-Sheet 8

INVENTORS
SHELDON LEE PASTOR
CARL W. CLARAS
ROBERT L. MOORE
RUDOLPH A. ROM
MYRON ZARR
BY
Carpenter Abbott Coulter & Kinney
ATTORNEYS

SELF-THREADING MAGNETIC TAPE RECORDING AND REPRODUCING APPARATUS

Filed May 8, 1961

INVENTORS
SHELDON LEE PASTOR
CARL W. CLARAS
ROBERT L. MOORE
RUDOLPH A. ROM
MYRON ZARR
BY
Carpenter Abbott Coulter & Kinney
ATTORNEYS

SELF-THREADING MAGNETIC TAPE RECORDING AND REPRODUCING APPARATUS

Filed May 8, 1961

INVENTORS
SHELDON LEE PASTOR
CARL W. CLARAS
ROBERT L. MOORE
RUDOLPH A. ROM
MYRON ZARR
BY Carpenter Abbott Coulter & Kinney
ATTORNEYS United States Patent Office 3,149,797

Patented Sept. 22, 1964

3,149,797

SELF-THREADING MAGNETIC TAPE RECORDING AND REPRODUCING APPARATUS

Sheldon Lee Pastor, Chicago, Carl W. Claras, Western Springs, Robert L. Moore, La Grange Highlands, Rudolph A. Rom, Berwyn, and Myron Zarr, Chicago, Ill., assignors to Minnesota Mining and Manufacturing Company, St. Paul, Minn., a corporation of Delaware Filed May 8, 1961, Ser. No. 108,352
17 Claims. (Cl. 242—55.13)

This invention relates to improvements in self-threading magnetic tape recording and reproducing apparatus, and more particularly relates to a cartridge type recorder-reproducer of the aforementioned type which is capable of automatically playing in sequence a plurality of cartridges placed therein.

A principal object of the present invention is to provide an improved self-threading magnetic type recorder-reproducer having a novel and efficient cartridge storing and changer mechanism which lends a high degree of compactness, handles the cartridges gently with complete control thereof at all times, and which permits rearrangement or replacement at any time of any cartridge disposed therein, except the cartridge being played at the time.

Another object of the invention is to provide an improved apparatus of the aforementioned character which utilizes a relatively stiff normally straight leader connected to the outer or free end of the tape and having an improved take-up reel for coaction with said leader in a novel manner to effect winding of the leader thereon.

Another object of the invention is to provide an improved apparatus of the class described having embodied therein an improved clutch structure associated with the take-up reel and affording a high torque drive therefor during a threading operation, said clutch structure affording a reduced torque drive for said take-up reel following winding of the leader thereon, to thereby avoid subjection of the relatively limp magnetic tape to deleterious tensile stresses.

Still another object of the invention is to provide an improved recorder-reproducer as aforedescribed having an improved driving and timing mechanism for effecting the operational sequences in the proper timed relationship.

Another object of the invention is to provide an improved recorder-reproducer of the aforementioned character having embodied therein novel sensing means cooperable with the leader during a rewind operation, said sensing means taking advantage of the fact that the leader has a greater transverse dimension than the tape and being operable to permit free travel of the tape therepast, but to frictionally engage the leader and to be moved by said engagement through a distance to do effective work during a rewind operation.

Another object of the invention is to provide an improved magnetic tape recorder-reproducer which is characterized by its portability, efficiency of operation, economy of manufacture, and compactness.

While the inventive concept has particular utility in the field of magnetic recording, the broader aspects of the invention are not so limited, it being obvious that various features thereof have substantial utility in other fields.

Objects and advantages of the invention other than those aforestated will become apparent as the description proceeds, reference being had to the drawings accompanying and forming a part of this specification, wherein.

Figure 1:
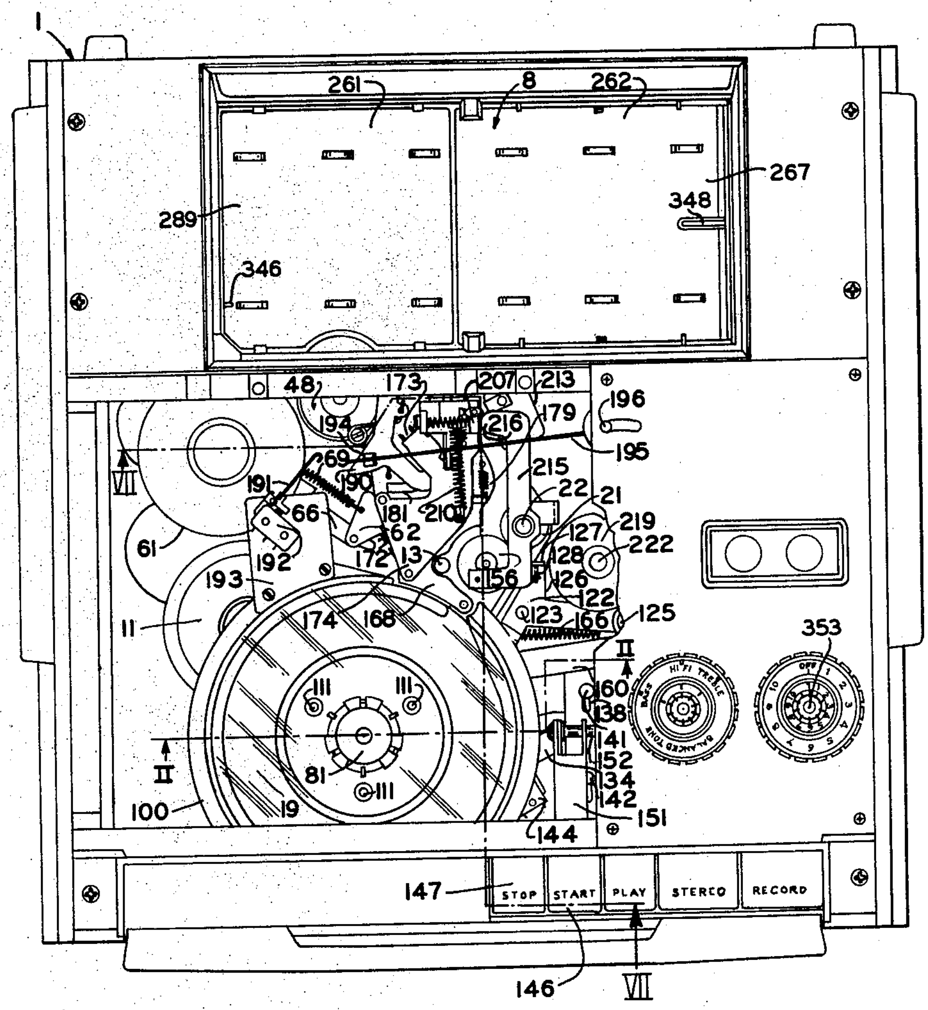
FIGURE 1 is a plan view of the improved magnetic tape recorder-reproducer with one cover plate section removed to expose the parts therebelow.
Figure 7:
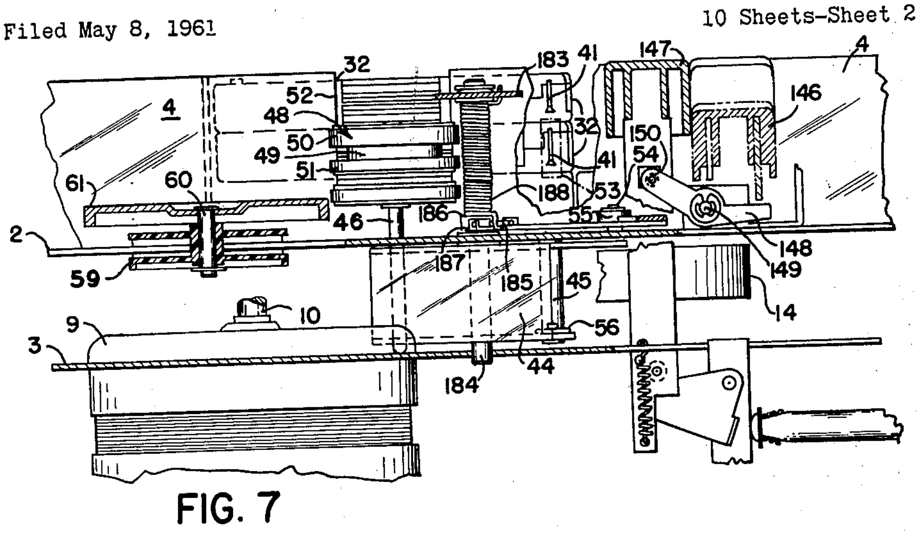
FIGURE 7 is a fragmentary vertical sectional view taken generally along the line VII—VII of FIGURE 1.
Figure 2:
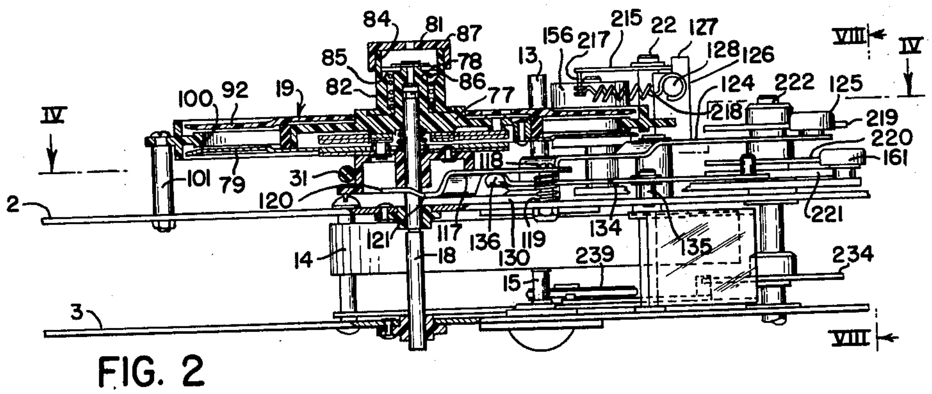
FIGURE 2 is a fragmentary vertical sectional view taken generally along the line II—II of FIGURE 1.
Figures 18, 20, 22:
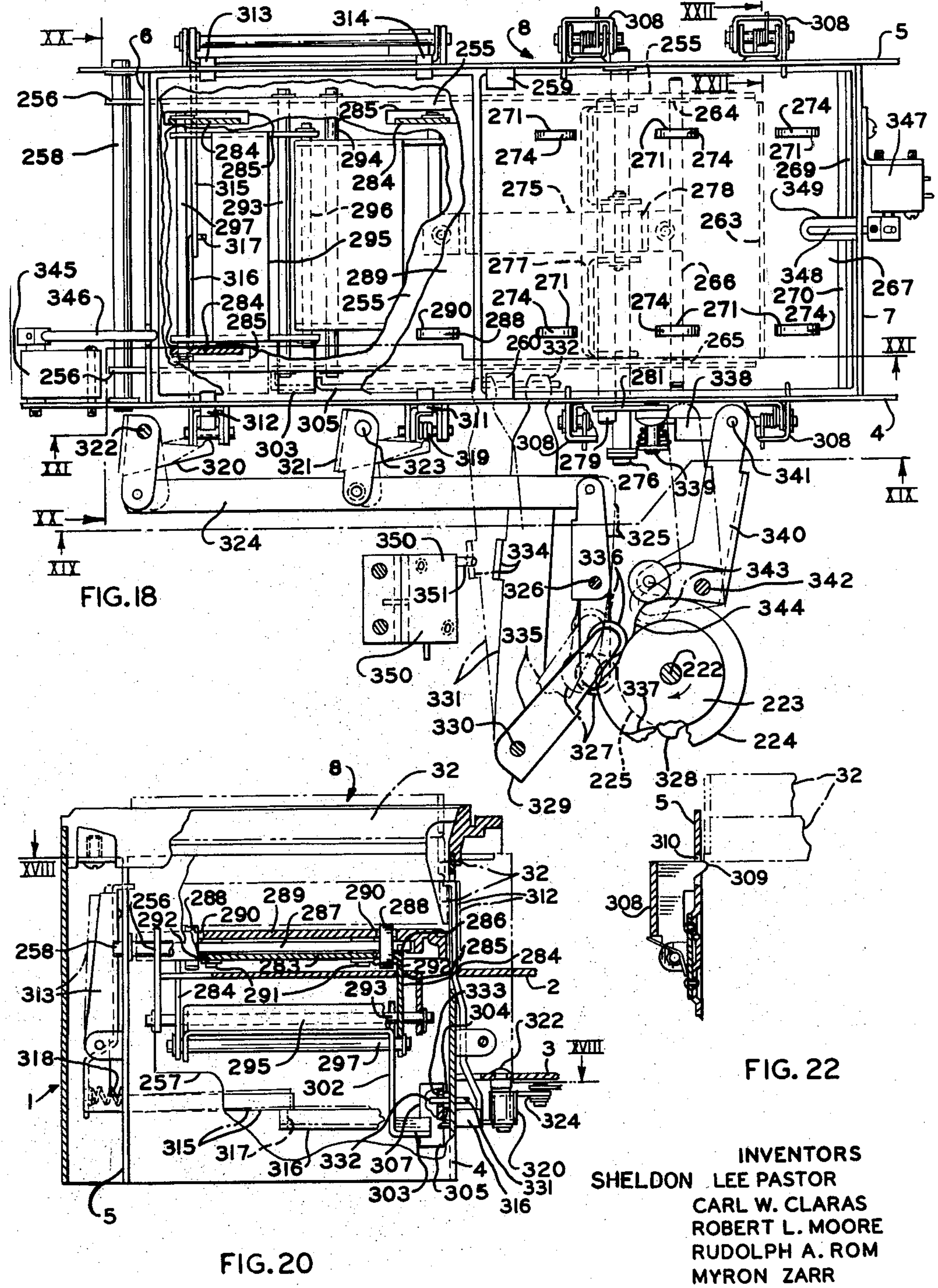
FIGURE 18 is a fragmentary sectional plan view of the cartridge storing and changing mechanism taken generally along the line XVIII—XVIII of FIGURE 20, parts being broken away.
FIGURE 20 is a fragmentary vertical sectional view taken generally along the line XX—XX of FIGURE 18, parts being broken away.
FIGURE 22 is a fragmentary vertical sectional view taken along the line XXII—XXII of FIGURE 18.

Referring more particularly to FIGURE 1 of the drawing, it will be observed that the improved recorder-reproducer comprises a generally rectangular box-like case which removably encloses a chassis on which the component parts of the invention are mounted. The chassis comprises an upper deck 2 and a lower deck 3 spaced therefrom as shown in FIGURES 2 and 7. As shown in FIGURE 18, the chassis includes at the rear thereof spaced parallel vertical plate or wall members 4 and 5 joined by spaced parallel vertical wall members 6 and 7 to provide a rectangular well forming part of a cartridge storage and changer mechanism indicated generally by the numeral 8. The improved recorder-reproducer also includes an amplifier and a pair of speakers, neither of which will be shown or described and which may be of any suitable construction.

Figure 6:
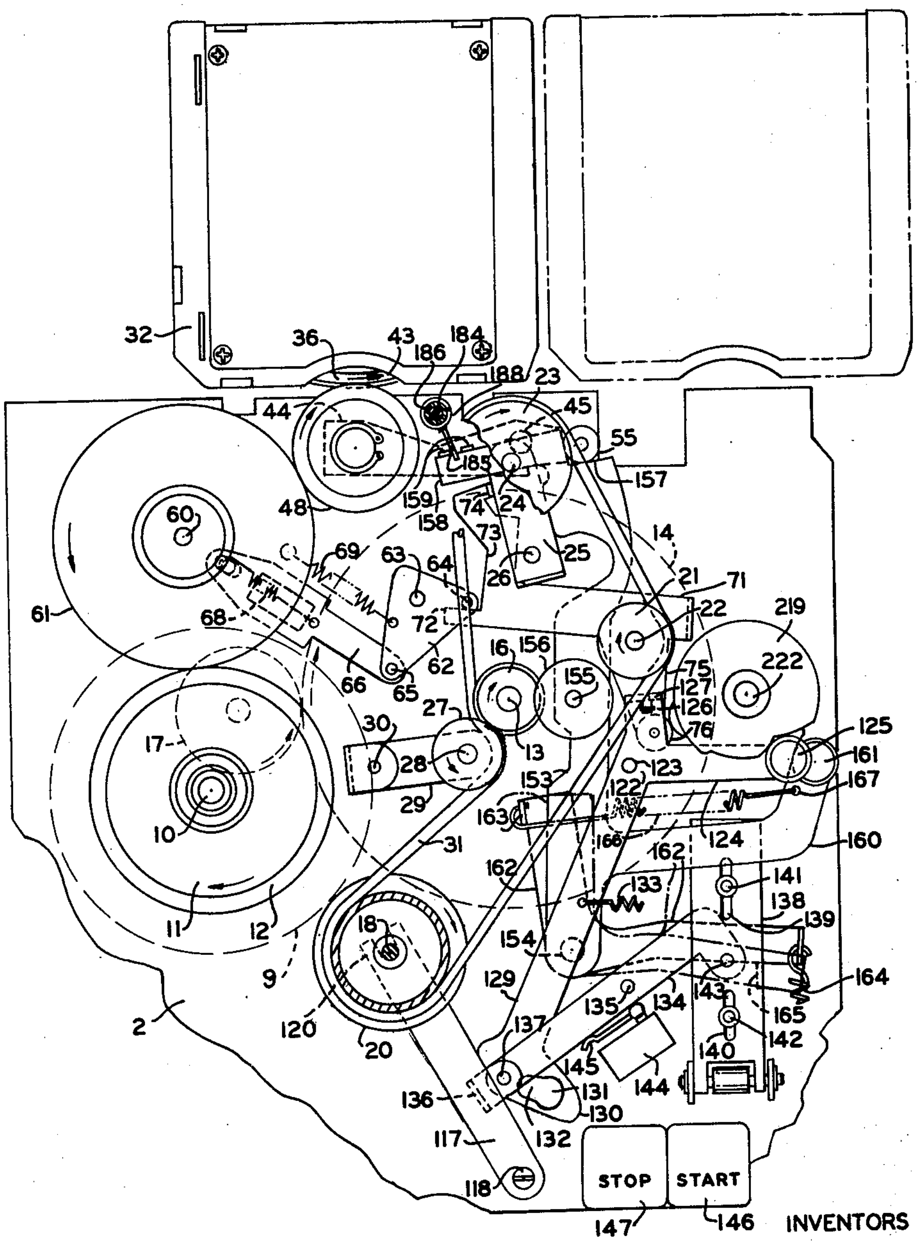
FIGURE 6 is a fragmentary plan view similar to FIGURE 4 showing the parts in "rewind" position.
Figures 8, 9:
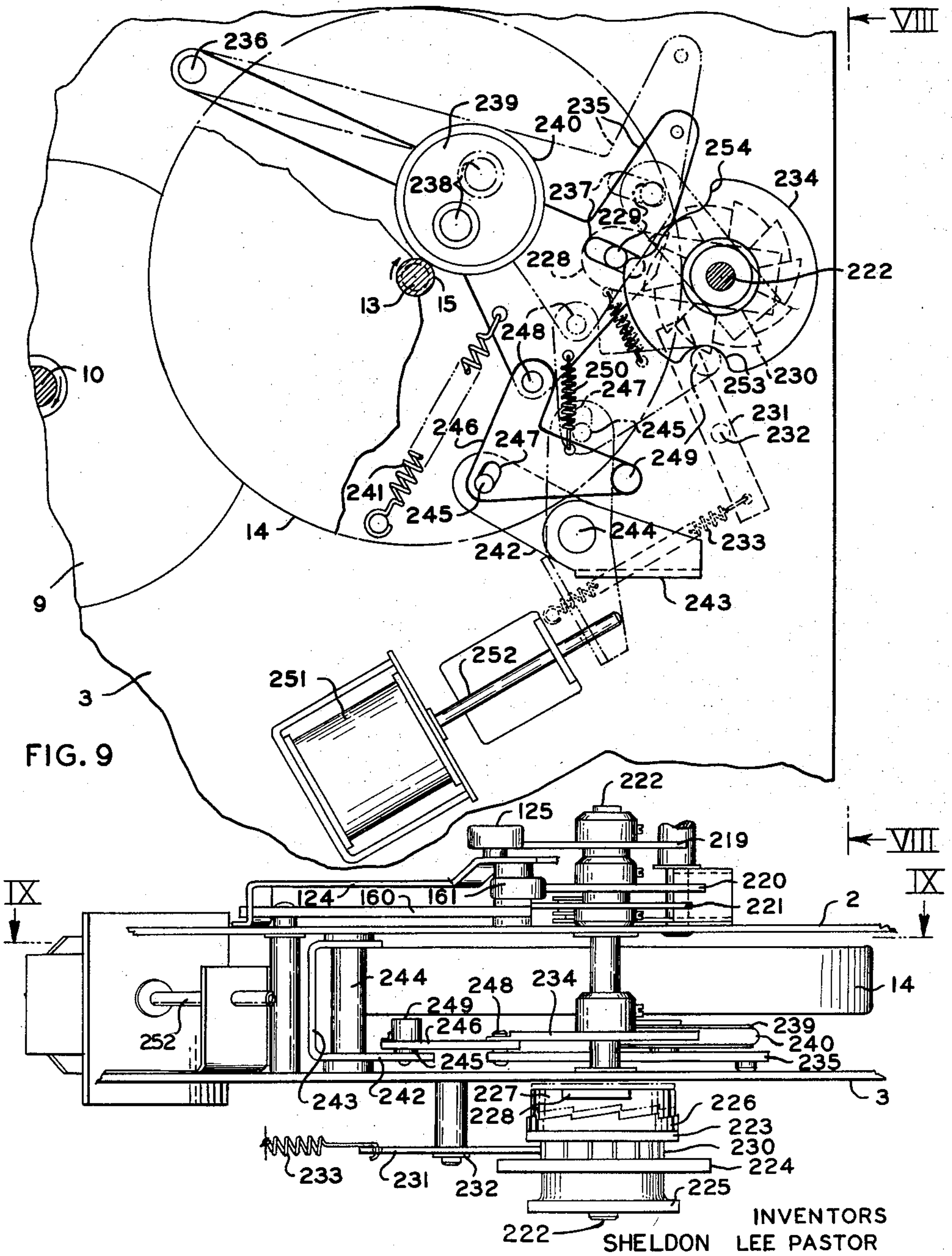
FIGURE 8 is a fragmentary vertical sectional view taken along the lines VIII—VIII of FIGURES 2 and 9.
FIGURE 9 is a fragmentary sectional plan view taken along the line IX—IX of FIGURE 8.

Power for operation of the mechanism of the improved recorder-reproducer is derived from an electrical motor 9 shown most clearly in FIGURES 7 and 9 as being supported by the lower deck 3 and having an upstanding drive shaft 10. As shown in FIGURE 6, the drive shaft 10 projects through the upper deck 2 and carries at its upper end a drive wheel 11, preferably having a rubber-like peripheral ring 12. Mounted in suitable bearings in the decks 2 and 3 is a capstan shaft 13 which projects above the deck 2 and has a fly wheel 14 fixed thereon between said decks as shown in FIGURE 2. Below the fly wheel, the shaft 13 is formed with a knurled portion 15, and above the deck 2 the shaft 13 has a belt drive pulley 16 (FIGURES 4 and 6) fixed thereon. A suitably mounted idler drive wheel 17 affords continuous driving engagement between the motor drive shaft 10 and the fly wheel 14 to afford continuous clockwise rotation of the fly wheel 14, capstan shaft 13 and belt drive pulley 16 whenever the motor 9 is operating.

Figure 3:
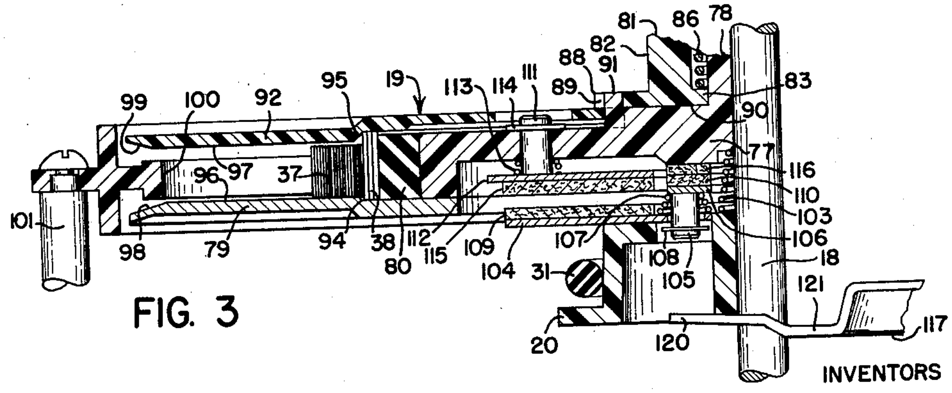
FIGURE 3 is an enlarged fragmentary vertical sectional view of the take-up reel and its associated clutch mechanism.

As shown in FIGURES 2 and 3, a vertical shaft 18 is mounted in suitable bearings and has a take-up reel 19 fixed to the upper end thereof. A clutch pulley 20 is freely rotatable on the shaft 18 below the take-up reel 19 and is associated with the take-up reel through a clutch mechanism which will be described hereinafter. A pulley 21 is freely rotatable on a vertical shaft 22, and a pulley 23 is freely rotatable on a stub shaft 24 carried by an arm 25 pivotally mounted on a vertical shaft 26. A pulley 27 is freely rotatable on a stub shaft 28 carried by an arm 29 pivotally mounted on a vertical shaft 30. An endless belt 31, for example of rubber-like material and of circular cross section, is trained around the pulleys 20, 21, 23, 16 and 27 as shown, so that clockwise rotation of the capstan 13 produces clockwise rotation of pulleys 20, 21 and 23, and counterclockwise rotation of the pulley 27.

As will more fully appear hereinafter, the changer mechanism 8 is adapted to accommodate a cartridge 32 (FIGURES 10 and 21) in "play" position therein, as well as a plurality of similar cartridges stacked thereabove as shown in FIGURE 7 and in dot and dash lines in FIGURES 20 and 21. The cartridge 32 is preferably of the type disclosed and claimed in the copending application of Briskin et al., Serial No. 102,805, filed April 13, 1961, and assigned to the assignee of the instant application. The cartridge 32 comprises a shallow rectangular container 33, for example of plastic, within which a supply reel 34 is rotatably mounted. When the cartridge 32 is in "play" position, the supply reel 34 is disposed in the same horizontal plane as the take-up reel 19. In the illustrated embodiment, the supply reel 34 comprises a central hub portion 35 and spaced circular side flanges 36.

Figure 16:
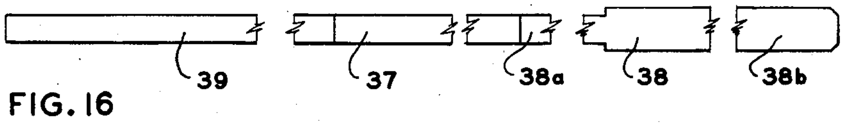
FIGURE 16 is a fragmentary elevational view of an extent of magnetic tape showing a leader attached to one end and a trailer attached to the other end.

Referring to FIGURE 16, a relatively limp magnetic tape 37 has a relatively stiff flexible normally straight leader 38 having a trailing end 38*a* of the same width as the tape 37. Major portion 38*b* of the leader 38 has a width greater than the spacing between the reel flanges 36. A trailer 39 is attached to the other end of the tape 37 and has a width substantially the same as that of said tape. The trailer 39 is stiffer than the said tape 37 but may be somewhat more flexible than the stiff normally straight leader. The free end of the trailer 39 is fixedly attached to the hub 35 of the reel 34, and said trailer, together with the tape 37 and the portion 39*a* of the leader is wound on the hub 35 between the flanges 36. The portion 38*b* of the leader, due to its greater width, is wound on the peripheries of the flanges 36 when the cartridge 32 is not in use.

An example of one type of magnetic recording tape which is satisfactory for use in the improved apparatus is one in which the backing or carrier film takes the form of tensilized polyethylene terephthalate .005 inch thick and .150 inch wide. The leader 38 may be made of polyethylene terephthalate .010 inch thick, the portion 38*a* being .150 inch wide and the portion 38*b* being .238 inch wide.

Figure 10:
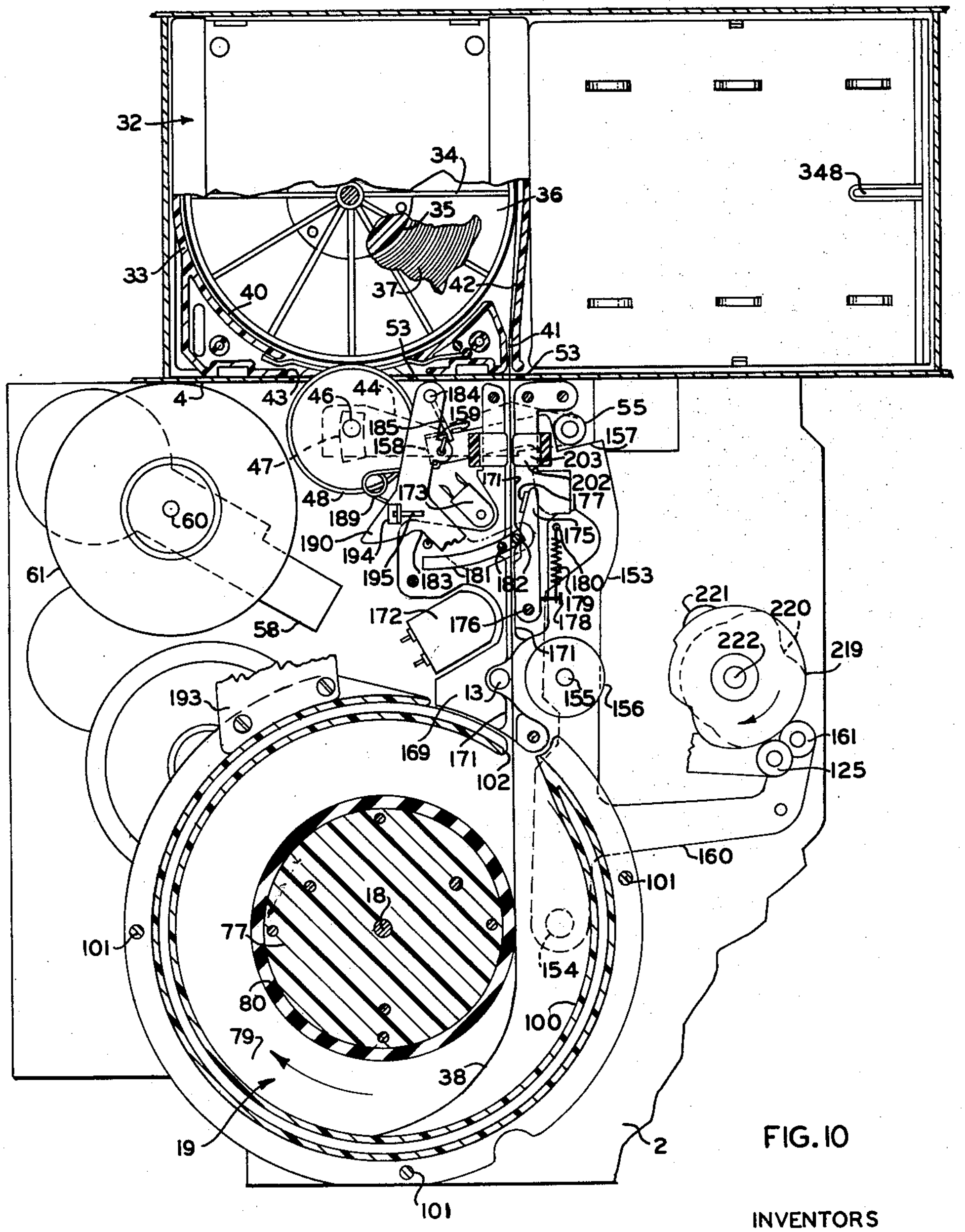
FIGURE 10 is a fragmentary sectional plan view taken generally in the plane of the tape path and as indicated by the line X—X of FIGURE 13, the parts being shown in the position assumed thereby during threading of the leader and tape.

The container 33 of the cartridge 32 is formed with a cylindrical inner wall surface 40 of a diameter affording sufficient clearance for accommodation of the leader portion 38*b* wound on the flanges 36. An edge opening 41 is formed in the container 33 for passage therethrough of the leader 38, tape 37 and trailer 39, and a wall surface 42 extends from the opening 41 into tangency with the surface 40 as shown in FIGURE 10 to afford means for guiding the leader 38 to the opening 41 upon clockwise rotation of the reel 34 as will hereinafter appear. The container 33 is also formed with at least one edge opening 43 (FIGURE 21) exposing the adjacent peripheral portions of the reel flanges 36 as well as the leader 38 wound thereon for a purpose to be described hereinafter.

Figure 19:
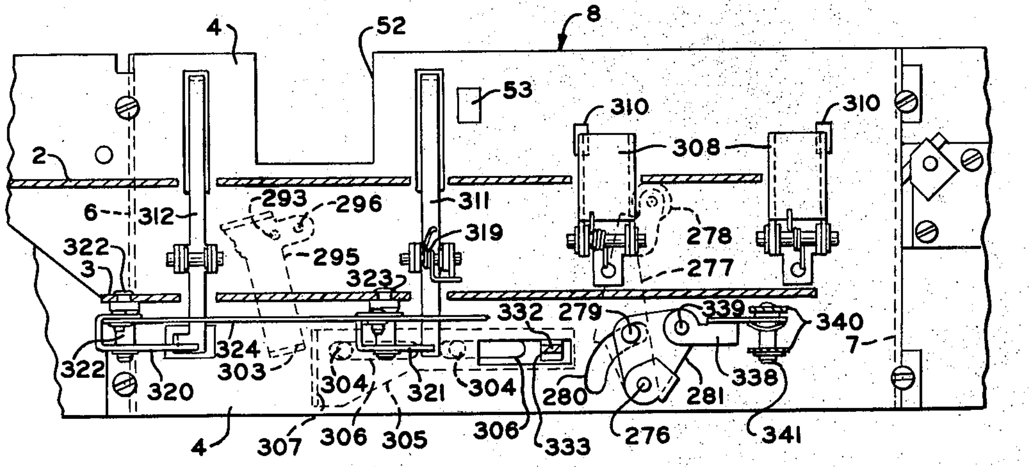
FIGURE 19 is a fragmentary vertical sectional view taken generally along the line XIX—XIX of FIGURE 18.

As shown most clearly in FIGURE 7, a channel shaped lever 44 is mounted between the decks 2 and 3 for pivotal movement on a shaft 45 depending from the deck 2. The lever 44 carries at one end a vertical shaft 46 which projects upwardly through a slot 47 (FIGURE 10) in the upper deck 2 and carries on its upper end a freely rotatable drive-out-rewind roller 48. As shown in FIGURE 7, the illustrated drive-out-rewind roller 48 has a central portion 49 of reduced diameter defining spaced upper and lower roller portions 50 and 51. As shown in FIGURES 7 and 19, the wall 4 of the chassis formed with an opening 52 and with an opening 53, the latter being shown in dot and dash lines in FIGURE 7. When a cartridge 32 is in "play" position, the opening 41 thereof is in registry with the wall opening 53, and the flanges 36 of the reel 34 thereof are disposed in the planes of the roller portions 50 and 51 of the drive-out-rewind roller 48. The lever 44 affords a swingable mounting for the drive-out-rewind roller 48, said roller being movable from the retracted or inoperative position thereof shown in FIGURES 1, 4 and 11 to the advanced or operative position thereof shown in FIGURES 6 and 10, and in dot and dash lines in FIGURE 4, wherein the roller portions 50 and 51 engage the leader 38 wound on the periphery of the reel 34 during a threading operation, and the peripheries of the flanges 36 during a rewind operation as will hereinafter appear.

At the end thereof opposite the shaft 46 the lever 44 carries a stub shaft 54 which extends through a suitable slot in the deck 2 and carries a roller 55 at its upper end for a purpose which will hereinafter appear. A torsion spring 56 (FIGURE 7) surrounds the shaft 45 and has one end suitably anchored, for example to the wall 4, its other end engaging the lever 44 to bias the same in the direction tending to move the roller 48 toward the wall 4, i.e., clockwise as viewed from above. The tension to which the resilient belt 31 is subjected tends to cause the pulley 23 to swing counterclockwise about the pivot 26 and to bring said belt into driving engagement with the drive-out-rewind roller 48 as indicated in dot and dash lines in FIGURE 4, to thereby effect counterclockwise rotation of said roller.

Alternatively, means is provided for driving the drive-out-rewind roller 48 in a clockwise direction when in operative position. To this end, the deck 2 is slotted as at 58 to slidably receive a spool-shaped bearing 59 (FIGURES 4 and 7) which carries an upstanding stub shaft 60 having a rewind drive idler wheel 61 freely rotatable on the upper end thereof. A triangular horizontal plate 62 is disposed above the deck 2 and is pivotally mounted on a vertical shaft 63. A pin 64 depends from one apex of the plate 62, and a pin 65 at another apex of said plate affords a pivotal connection to one end of a link 66. The other end of the link 66 is slotted to receive a pin 67 (FIGURE 4) carried by the bearing 59, and a tension spring 68 has one end connected to the pin 67 and its other end anchored to the link 66 to bias the pin 67 toward the inner end of the accommodating slot. A helical spring 69 has one end connected to the plate 62 and its other end anchored to a pin 70 fixed to the deck 2, said spring being operative to bias the plate 62 in a clockwise direction about its pivot 63, and through the link 66, to bias the rewind idler 61 outwardly away from the drive wheel 11 and drive-out-rewind roller 48. Upon counterclockwise rotation of the plate 62 about the pivot 63, the link 66, acting through the spring 68 and pin 67 pulls the rewind idler 61 into driving engagement with the drive wheel 11 and the drive-out-rewind roller 48 to thereby effect clockwise rotation of the latter.

Means is provided for effecting engagement of the forward drive for the drive-out-rewind roller 48, disengagement of all drive for said roller or engagement of the rewind drive for said roller. To this end, an irregularly shaped stamping 71 is mounted for pivotal movement above the deck 2 about the axis of the pulley shaft 22. The stamping 71 has a projection 72 for coaction with the depending pin 64 on plate 62, and it also has a laterally projecting arm 73 formed with an upstanding lug 74 (FIGURE 6) for coaction with the arm 25. The stamping 71 has three operative positions, the intermediate position thereof is shown in solid lines in FIGURE 4, and in this position the upstanding lug 74 engages the arm 25 to hold the belt 31 out of engagement with the roller 48. At the same time, the bias of the spring 69 holds the rewind idler 61 out of engagement with the drive-out-rewind roller 48. The "drive-out" or "thread" position of the member 71 is shown in dot and dash lines in FIGURE 4, and in this position the upstanding lug 74 has been withdrawn from the arm 25 sufficiently to permit engagement of the belt 31 with the drive-out-rewind roller 48 for counterclockwise rotation of the latter. At the same time, the action of the spring 69 holds the rewind idler 61 out of engagement with the rollers 11 and 48.

The "rewind" position of the member 71 is shown in FIGURE 6. In this position the upstanding lug 74 engages the arm 25 and holds the latter in a position wherein the belt 31 is spaced substantially from the drive-out-rewind roller 48. At the same time, the projection 72 has engaged the depending pin 64 on plate 62 and rotated said plate counterclockwise against the bias of the spring 69, such movement being effective through the link 66 and spring 68 to pull the rewind idler 61 into driving engagement with both the drive roller 11 and the drive-out-rewind roller 48 to thereby cause clockwise rotation of the latter. The stamping 71 is formed with a laterally projecting arm 75 which carries a cam following roller 76 through which the disposition of the stamping 71 is controlled as will hereinafter appear.

Referring now to FIGURES 2, 3, 10 and 11, the take-up reel 19 comprises a hub portion 77 of generally inverted cup-shape having an upstanding tubular central portion 78 fixed on the shaft 18. A circular flange 79 is fixed coaxially to the lower side of the hub 77, and an annular member 80 of rubber-like material snugly surrounds the said hub as shown. A knob 81 has a tubular body portion 82 surrounding the hub extension 78 and having an inturned annular flange 83 at its lower end. The body portion 82 is formed with a counterbore 84 at its upper end for accommodation of a washer 85 fixed on the upper end of the hub extension 78. A helical compression spring 86 surrounds the hub extension 78 within the body portion 82 and has one end abutting the washer 85, the other end thereof being in abutment with the inturned flange 83. A cover 87 is threaded onto and closes the upper end of the body portion 82 of knob 81.

Figure 11:
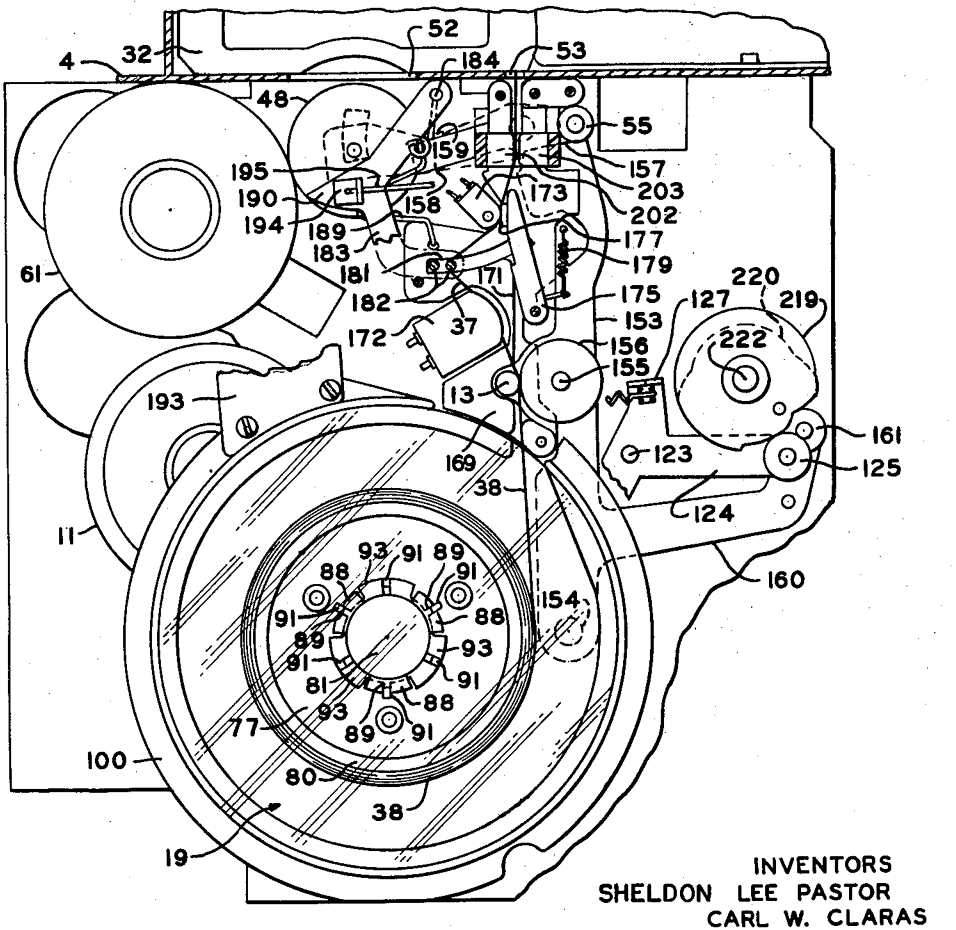
FIGURE 11 is a view similar to FIGURE 10 showing the parts in the position they assume during playing of or recording onto the tape.

The body portion 82 is formed on its lower end with, for example, three radially outwardly directed circumferentially segmental flanges 88, each of which is formed with a central peripheral rectangular notch 89 as best shown in FIGURES 3 and 11. The spring 86 biases the knob 81 downwardly along the hub portion 78 into engagement with an upwardly offset annular surface portion 90 formed on the hub 77. At the periphery of the upwardly offset portion 90, the hub 77 is formed with a plurality, for example six equally spaced upstanding rectangular lugs 91. A circular side flange 92, for example of clear plastic, overlies the hub 77 and is formed with a central opening including three equally spaced segmental cutout portions 93 through which alternate lugs 91 project, said side flange member also being formed with rectangular notches at the central opening thereof for accommodating the remaining upstanding lugs 91. The flanges 88 of the knob 81 normally overlie the portions of the flange 92 intermediate the cutout portions 93 so that axial upward movement of the flange 92 is resisted by the bias of the spring 86. Lifting the knob 81 sufficiently for the flanges 88 to clear the tips of the lugs 91, and then rotating said knob with respect to the flange 92 to bring the flanges 88 in registry with the cutout portions 93, places said knob in position to permit removal of the side flange 92 by lifting the same, since the cutout portions 93 are large enough to clear the flanges 88.

As best shown in FIGURE 3, the flanges 79 and 92 are offset axially toward each other radially outwardly of the member 80, as at 94 and 95 to provide a spacing between the parallel inner surfaces 96 and 97 thereof which normally approximates the width of the magnetic tape 37. It will be observed that radially inwardly of the offset portions 95, the flanges 79 and 92 afford an annular space of substantially greater width than the normal spacing between the surfaces 96 and 97, said space being adapted to accommodate the leader 38 as will hereinafter appear. The inner surfaces 96 and 97 of the flanges 79 and 92 are peripherally axially outwardly flared as at 98 and 99.

As shown most clearly in FIGURES 3 and 10, an arcuate preferably circular deflecting and retaining member 100 is suitably mounted, for example on studs 101, and is disposed with its cylindrical inner surface in spaced relation between the peripheral portions of the flanges 79 and 92 and coaxial therewith. As shown in FIGURE 10, the member 100 is formed with an opening 102 for passage therethrough of the leader and tape.

The take-up reel 19 is provided with a novel dual torque clutch mechanism which will now be described. Referring to FIGURE 3, a compression spring 103 surrounds the shaft 18 and is interposed between the hub 77 and the floating pulley 20, biasing the pulley 20 downwardly. The upper surface of the pulley 20 carries a metal disk 104 fixed thereto, and both the pulley 20 and disk 104 are apertured to accommodate a plurality of axially extending guide pins 105 which are fixed at their upper ends to an annular stamping 106. A spring 107 surrounds each pin 105 between the plate 104 and stamping 106 and biases said stamping and pins axially upwardly. A retaining washer 108 is fixed to the lower end of each pin 105 to limit the axial upward movement of said pins toward the position in which the washers 108 engage the underside of the plate 104. The upper surface of the plate 104 has an annular facing 109 fixed to the upper surface thereof and the annular member 106 similarly has an annular facing 110 fixed to the upper surface thereof.

The hub 77 is apertured to slidably receive a plurality of vertical pins 111 which are fixed at their lower ends to an annular plate 112. A compression spring 113 surrounds each pin 111 and is interposed between the hub 77 and plate 112 to bias said plate downwardly. A retaining washer 114 is fixed to the upper end of each pin 111 and limits the downward movement of said pin to the position in which the washers 114 engage the upper surface of the hub 77. The annular plate 112 has an annular facing 115 fixed to the undersurface thereof, the facing 115 being substantially identical in size and shape with the facing 109 and coaxial therewith. An annular facing 116 which may be identical in size and shape with the facing 110 is fixed to the undersurface of the hub 77 coaxial with the facing 110. The facings 109, 110, 115 and 116 are preferably of felt material.

As aforementioned, the spring 103 biases the clutch pulley 20 downwardly, and unless otherwise restrained, said pulley would move under the bias of the spring 103 to a position (not shown) wherein the facing 110 is spaced from the facing 116 and, of course, the facing 109 is spaced from the facing 115. With the pulley 20 disposed in its lowermost position, no rotative force can be transmitted from the pulley 20 to the take-up reel 19. By lifting the pulley 20 to the intermediate or low torque position shown in FIGURE 3, wherein the facing 110 frictionally engages the facing 116, a low torque driving connection is provided between the pulley 20 and the take-up reel 19. The low torque driving connection aforementioned applies a rotating force to the take-up reel 19 which is less than that which can deleteriously stress the magnetic tape 37.

Figure 4:
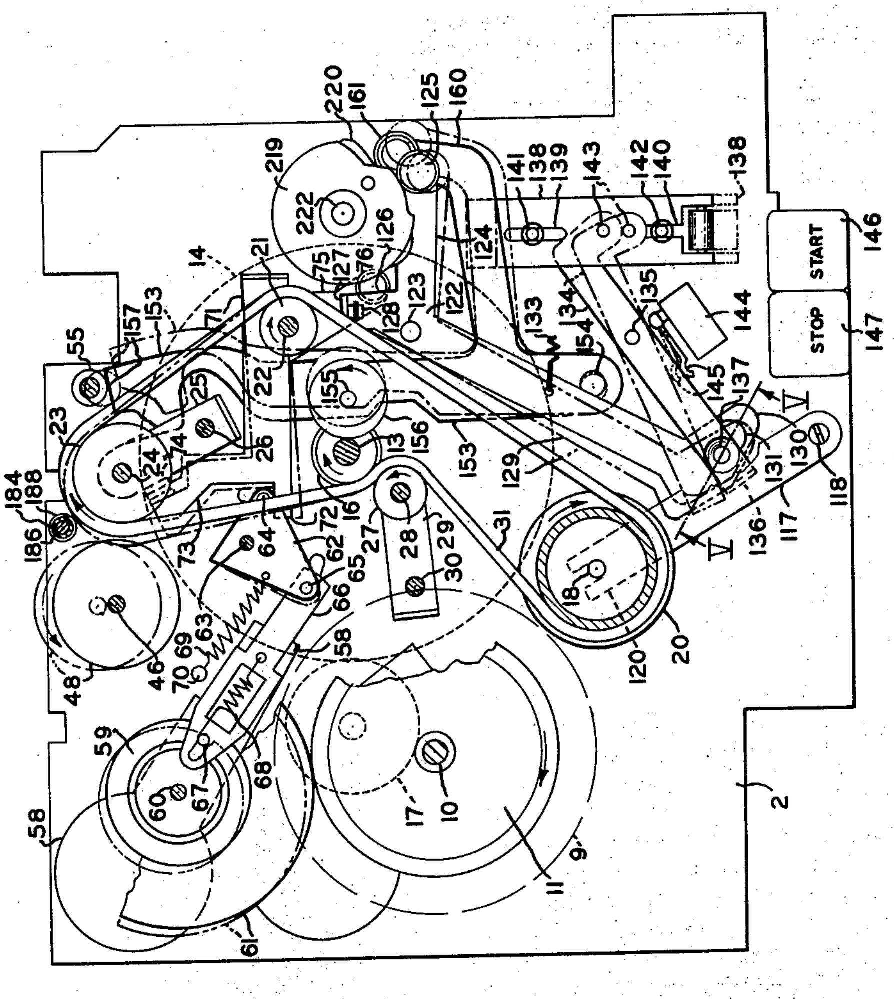
FIGURE 4 is a fragmentary sectional plan view taken generally along the line IV—IV of FIGURE 2, the position of the parts shown in solid lines being the "off" position of said parts, and the position of said parts assume upon depression of the "start" button being shown in dot and dash lines.

As shown most clearly in FIGURES 2, 4 and 6, a clutch actuating lever 117 has one end apertured to receive a screw 118 threaded into the deck 2, there being a helical spring 119 surrounding the screw 118 and holding the adjacent end of the lever 117 elevated against the head of said screw and spaced above the deck 2. The other end of the lever 117 is bifurcated as at 120 in FIGURES 4 and 6, said bifurcated end embracing the shaft 18 and engaging the floating pulley 20 as shown in FIGURES 2 and 3. The lever 117 has a downwardly offset portion 121 engagement of which with the deck 2 defines the lowermost or "off" position of the pulley 20.

Means is provided for actuating the clutch lever 117 to effect movement of the pulley 20 between the "off," the "low torque" and the "high torque" positions thereof. To this end a three-armed lever 122 is pivoted on a vertical pin 123 projecting upwardly from the deck 2 and has an arm 124 which carries a cam following roller 125. The lever 122 also has an arm 126 having an upturned end portion terminating in a lug 127 shown most clearly in FIGURE 2. The upturned end of the arm 126 carries a horizontal pin 128 for a purpose which will appear hereinafter. The lever 122 is also formed with an elongated arm 129 having an enlarged end portion 130 formed with upwardly offset portions 131 and 132 shown most clearly in FIGURES 5 and 6. It will be observed that the upper surface of the portion 132 is spaced above the plane of the end portion 130, and the upper surface of the portion 131 is spaced above the upper surface of portion 132. A tension spring 133, has one end connected to the arm 129 and has its other end suitably anchored to bias the lever 122 in a counterclockwise direction.

A generally L-shaped lever 134 is pivotally mounted on a vertical pin 135 and terminates at one end in a rounded, upturned flange 136 (FIGURE 2) which engages the underside of the clutch actuating lever 117. Adjacent the enlarged end portion 130 of the lever arm 129, the lever 134 is formed with a downwardly offset circular portion 137 which is adapted to engage the upper surface of the lever end portion 130 as well as the upper surfaces of the upwardly offset portions 132 and 131 thereof to provide, when engaged with said surfaces respectively, the "off," the "low torque" and the "high torque" positions of the lever 117 and clutch pulley 20.

The other end of the lever 134 is pivotally connected, as by pin 143, to a slide bar 138 which is slotted as at 139 and 140 to receive fixed guide pins 141 and 142. The slide bar 138 is movable between the solid line "start" position thereof shown in FIGURE 4 and the dot and dash line "stop" position shown in said figure to thereby effect movement of the lever 134. A normally open switch 144 has an arm 145 positioned adjacent the lever 134 and movable from the dot and dash line position thereof shown in FIGURE 4 to the solid line position thereof by movement of the lever 134 to its solid line position in said figure, such actuation effecting closure of the contacts of the switch 144.

As best shown in FIGURES 1 and 7, a start key 146 and a stop key 147 are suitably mounted for vertical movement. As shown in FIGURE 7, a rocker arm 148 is pivotally mounted on a fixed pin 149 and has one end thereof pivotally connected to the stop key 147, as at 150. The other end of the rocker arm 148 underlies the start key, and said arm is operative to interconnect the start and stop keys, such that depression of the stop key while the start key is in depressed position, causes the start key to be raised. Suitable mechanism, for example including a cam lever 151 pivotally mounted on a horizontal pin 152 (FIGURE 1) is connected to the start key and is operatively related to the slide bar 138 in a well known manner to effect movement of said slide bar from the dot and dash line position to the solid line position thereof shown in FIGURE 4 upon depression of the start button 146. The aforementioned actuating mechanism is such that the start button 146 and the parts associated therewith remain in the positions to which they are moved by depression of said start key until the stop key 147 is subsequently depressed to return the start key 146 and its associated parts to their initial positions.

Referring to FIGURES 4, 6, 10 and 11, an irregularly shaped arm 153 is pivotally mounted at one end on a fixed pin 154, and intermediate its length said arm carries an upstanding stub shaft 155 on which a pressure roller 156 of rubber-like material is freely rotatable, said roller being cooperable with the capstan 13. The arm 153 has an end surface 157 cooperable with the roller 55 and, as best shown in FIGURE 6, said arm has a laterally projecting end portion 158 formed at one edge with a pair of spaced upstanding lugs 159. The arm 153 is also formed with an L-shaped branch arm 160 which carries a cam following roller 161 at its outer end. The arm 153 has two operative positions between which it can be moved on the pivot 154, i.e. the advanced position thereof shown in FIGURE 11 and in solid lines in FIGURE 4 wherein the pressure roller 156 is in engagement with the capstan 13, and the retracted position thereof shown in FIGURES 6 and 10 and in dot and dash lines in FIGURE 4. It will be observed that when the arm 153 is in its retracted position, the drive-out-rewind roller 48 is advanced through the opening 52 in the wall 4 into position for engagement with the leader 38 wound on the periphery of the reel 34 or with said reel itself as shown in FIGURES 6 and 10 and in dot and dash lines in FIGURE 4. Upon advancing movement of the arm 153, the coaction of the end surface 157 with the roller 55 pivots the arm 44 against the bias of the spring 56 (FIGURE 7) to retract the drive-out-rewind roller 48 from the opening 52 in wall 4 to the inoperative position thereof shown in FIGURES 4 and 11.

Referring to FIGURE 6, an L-shaped crank member 162 is also pivoted on the pin 154 and is formed at the end of one arm thereof with an upstanding lug 163 positioned for engagement with the adjacent edge of the arm 153. A tension spring 164 is connected at one end to the end of the other arm of crank 162, and the other end of said spring is suitably anchored such that said spring biases the crank 162 in a clockwise direction. The slide bar 138 is formed with a downturned lug 165 shown in dotted lines in FIGURE 6, and the spring 164 biases the adjacent arm of the crank 162 into engagement with the lug 165 such that the crank 162 follows the movement of the slide bar 138. Thus, upon retractile movement of the slide bar 138 in response to depression of the stop key 147 the crank 162 pivots to the dot and dash line position thereof shown in FIGURE 6, and if the arm 153 is in advanced position at the time, the lug 163 on said crank arm engages the arm 153 and moves the same to its retracted position shown in FIGURE 6. A tension spring 166 is connected at one end to the upstanding lug 163 on crank 162 and has its other end connected to the branch arm 160 of the arm 153, as at 167. The spring 166 is under continuous tension at all times.

Referring to FIGURES 10, 11, 13 and 15, a pair of irregularly shaped guide plates 168 and 169 are vertically spaced a distance not substantially greater than the width of the magnetic tape, the inner surfaces of said plates being disposed substantially coplanar with the inner surfaces 96 and 97 of the take-up reel flanges 79 and 92. The plates 168 and 169 are formed with straight line rectangular grooves 170 and 171, respectively, said grooves being of sufficient depth to accommodate the opposite edge portions of the leader 38 and being operable to afford a predetermined path for said leader from adjacent the opening 53 in the wall 4 to the opening 102 in the annular guide and deflecting member 100 at the take-up reel 19. The aforementioned leader path passes between the capstan 13 and the pressure roller 156 when the latter is retracted, as best shown in FIGURE 10. Offset from the path afforded by the grooves 170 and 171 a magnetic play-record head 172 and a magnetic erase head 173 are mounted, for example by suspension from a plate 174 fixed on the upper plate 168 as shown in FIGURE 1. As shown in FIGURE 10, a pressure pad member 175 is disposed between the guide plate 168 and 169 and is pivotally mounted at one end on a pin 176, said member carrying a pad 177, for example of felt at its other end. The member 175 carries a pin 178, and a tension spring 179 is connected at one end to the pin 178 and is anchored to a fixed pin 180 at its other end. The spring 179 thus biases the member 175 counterclockwise toward the position thereof shown in FIGURE 11.

The upper and lower guide plates 168 and 169 are formed with registering arcuate slots 181 for accommodation of a pair of spaced vertical pins 182 which depend from the end of an arm member 183 mounted for pivotal movement on the axis of a vertical shaft 184. As best shown in FIGURES 6 and 7, the shaft 184 is mounted in suitable bearings in the decks 2 and 3, and above the deck 2 said shaft carries a horizontally directed pin 185, the end of which is disposed between the upstanding lugs 159 of the portion 158 of the arm 153. A sleeve 186 is telescoped onto the shaft 184 and has a segmental cutout 187 accommodating the pin 185 and coacting therewith to permit limited relative movement between the shaft 184 and sleeve 186. The arm 183 is fixed to the upper end of the sleeve 186, and a torsion spring 188 surrounds the sleeve 186, having one end anchored to the pin 185 and its other end anchored to the arm 183 to bias the latter and sleeve 186 in a clockwise direction and pin 185 and shaft 184 in a counterclockwise direction. The structure just described affords a spring loaded lost-motion connection between the member 183 and the arm 153.

When the arm 153 is in its retracted position shown in FIGURE 10, the member 183 is disposed in the position thereof shown in said figure wherein the pins 182 are disposed on opposite sides of the path afforded by the grooves 170 and 171 of the guide plates. When the member 183 is in the position shown in FIGURE 10, the outermost pin 182 engages the pressure pad member 175 to hold the same against the bias of the spring 179 in the retracted position thereof shown in FIGURE 10 wherein said member and the pad 177 are out of the path of the leader and tape. An overcenter spring 189 has one end connected to the member 183 and has its other end suitably anchored to insure full travel of the member 183 to the position thereof shown in FIGURE 10. Advancing movement of the arm 153, acting through the upstanding lugs 159, pin 185 and torsion spring 188 tends to cause clockwise swinging movement of the member 183 to the position thereof shown in FIGURE 11 wherein the pins 182 are disposed at the opposite end of the slots 181. Such movement of the pins 182 permits the spring 179 to swing the pressure pad member 175 toward the position thereof shown in FIGURE 11 wherein the pad 177 is disposed adjacent the erase head 173. The overcenter spring 189 also insures full travel of the member 183 to the position thereof shown in FIGURE 11.

The aforementioned spring loaded lost motion connection permits the member 183 to be moved to the position thereof shown in FIGURE 10 by force exerted on the pins 182 without rotation of the shaft 184 and pin 185. The arm 183 is formed with a projection 190 for coaction with the arm 191 (FIGURE 1) of a normally open switch 192 mounted, for example, on a plate 193 fixed to the annular guide and deflecting member 100. Upon clockwise movement of the member 183 to the position of FIGURE 11, the projection 190 actuates and moves past the switch arm 191, but such actuation has no effect upon the contacts of switch 192. Upon counterclockwise movement of the member 183 from the position of FIGURE 11, the projection 190 actuates the switch arm 191 as it moves therepast, effecting closure of the contacts of said switch by such actuation.

Referring to FIGURES 1, 10 and 11, the member 183 carries an angled bracket 194 having an upstanding apertured flange for receiving a rod 195 which is freely slidable therethrough and has an upturned end portion preventing removal of said rod from said upstanding flange. The opposite end of the rod 195 is connected to a button 196 (FIGURE 1) so that actuation of said button toward the right when the member 183 is in the position thereof shown in FIGURE 11 swings the member 183 toward the position thereof shown in FIGURE 10 with actuation of the switch 192 and closure of the contacts thereof during such movement of the member 183.

Figures 12, 14:
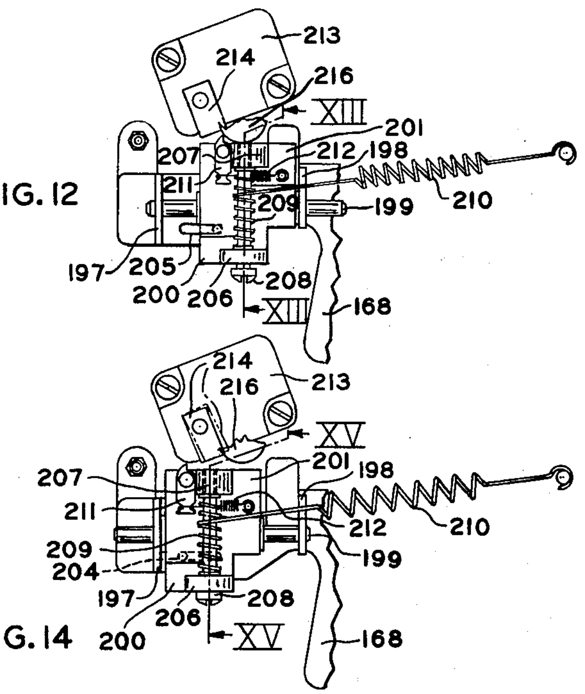
FIGURE 12 is a fragmentary plan view of the mechanism for sensing the completion of a rewind operation, the parts of said mechanism being in the normal positions they assume at all times except during rewinding of the tape and leader.
FIGURE 14 is a fragmentary plan view similar to FIGURE 12 showing the position to which the parts are moved by passage of the leader therethrough during rewinding of the tape and leader.
Figure 13:
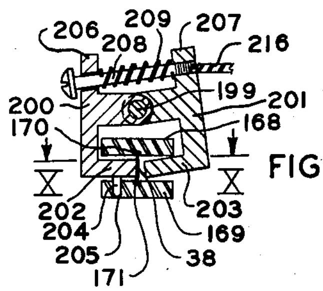
FIGURE 13 is a fragmentary vertical sectional view taken along the line XIII—XIII of FIGURE 12.
Figure 15:
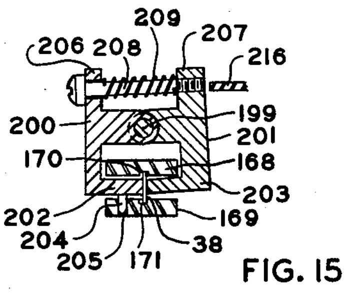
FIGURE 15 is a vertical sectional view taken along the line XV—XV of FIGURE 14.

Referring to FIGURES 1 and 12 to 15, the improved recorder-reproducer includes sensing means operative during a rewind operation to sense the passage of the leader into the cartridge. To this end, a pair of upstanding apertured bracket members 197 and 198 are mounted on the upper guide plate 168 adjacent the wall 4, and a horizontal shaft 199 is axially slidable on said brackets. A pair of cooperating sensing members 200 and 201 are pivotally mounted on the shaft 199 and have inturned jaw portions 202 and 203 disposed between the upper and lower guide plates 168 and 169, said jaw portions terminating in rounded opposing inner edge surfaces shown most clearly in FIGURES 10 and 11. The jaw portion 202 carries a depending pin 204 slidable in a slot 205 formed in the lower guide plate 169 and parallel with the shaft 199. The coaction of the pin 204 and slot 205 effects disposition of the inner edge surface of the jaw portion 202 adjacent one side of the guideway provided by the grooves 170 and 171 in the plates 168 and 169 as shown in FIGURES 13 and 15.

The members 200 and 201 are formed on their upper ends with upstanding apertured lugs 206 and 207, and a screw 208 extends loosely through the aperture in the lug 206 and is threaded into the aperture in the lug 207, there being a helical compression spring 209 surrounding the screw 208 and biasing the lugs 206 and 207 apart toward the limit permitted by engagement of the head of the screw 208 with the lug 206. This limit affords a spacing between the opposed edge surfaces of the jaw portions 202 and 203 which is greater than one transverse dimension, for example the thickness, of the tape 37, but is somewhat less than a similar transverse dimension, for example the thickness, of the leader 38. When a leader 38 is used which is .010 inch thick, a satisfactory minimum spacing between the opposing surfaces of the jaw portions 202 and 203 may be .005 inch. The sensing members 200 and 201, together with the shaft 199 are biased toward the right (as viewed in FIGURES 12 and 14) into engagement with the bracket 198 by a tension spring 210 having one end connected to the screw 208 and having its other end suitably anchored.

The member 201 carries a pivotally mounted sear 211 biased counterclockwise to the position shown in FIGURES 12 and 14 by a light tension spring 212 anchored at one end to said member. The sear 211 is prevented from rotating counterclockwise beyond its position shown in FIGURES 12 and 14 by virtue of its abutment with the lug 207. It can, however, pivot clockwise against the bias of the spring 212. A normally open switch 213 has a swingable actuating arm 214 which is biased to the position thereof shown in solid lines in FIGURES 12 and 14 and is movable counterclockwise from said position to effect closure of the contacts of the switch 213. Movement of the members 200 and 201 toward the left from the position of FIGURE 12 to that of FIGURE 14 moves the sear 211 into engagement with and past the arm 214, said sear being pivoted clockwise by such engagement and then returning to its initial position upon clearing the arm 214. Upon subsequent return movement of member 200 and 201 toward the right to the position of FIGURE 12 causes the sear 211 to engage the switch arm 214 and swing the latter to the dot and dash line position thereof shown in FIGURE 14 as said sear engages and then clears said switch arm without pivotal movement of said sear. Such actuation of the switch arm 214 effects closure of the contacts thereof, and upon the sear clearing said arm, the latter returns to its initial position and the contacts of the switch 213 reopen.

Referring again to FIGURE 1, a generally U-shaped lever 215 is pivotally mounted on the upper end of the shaft 22 and has a rounded end portion 216 positioned for coaction with the upstanding lug 207 of sensing member 201. The other end of the lever 215 carries a depending pin 217 (see FIGURE 2) and a tension spring 218 has one end connected to the pin 217 and has its other end connected to the pin 128 carried by the upstanding arm portion 126 of the member 122. The spring 218 biases the lever 215 in a counterclockwise direction tending to move said lever into engagement with the upstanding lug 127. Except during a rewind operation, the spring 218 biases the lever 215 to the position shown in FIGURES 1, 12 and 13 wherein the end portion 216 engages the upstanding lug 207 and pivots the member 201 counterclockwise as viewed in FIGURE 13 about the shaft 199 and against the bias of the compression spring 209 to thereby withdraw the inner edge surface of the jaw member 203 from the inner edge surface of the jaw member 202 to provide a gap between said edge surfaces substantially greater than the thickness of the leader 38. Such pivotal movement of the member 201 moves the head of the screw 208 out of engagement with the lug 206 as shown in FIGURES 12 and 13. As will hereinafter appear, during a rewind operation the upstanding lug 127 of the member 122 engages the lever 215 and pivots the latter clockwise to retract the end portion 216 out of engagement with the upstanding lug 207, permitting return of the member 201 to the sensing position of FIGURE 15.

Movement of the lever 122, and of the arm 153 and lever 71 is under the control of cams 219, 220 and 221 which are fixed on a vertical cam shaft 222 and coact respectively with the cam following rollers 125, 161 and 76. The cam shaft 222 is mounted in suitable bearings in the decks 2 and 3, and as shown in FIGURES 8 and 18, cams 223, 224 and 225 are fixed on the lower end of the said cam shaft below the deck 3 for controlling the operation of the changer mechanism 8 as will hereinafter appear.

Figure 23:
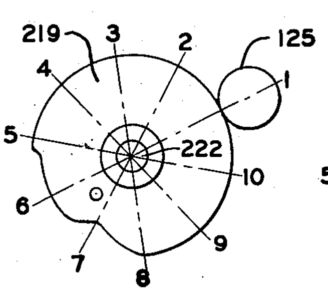
FIGURES 23 to 28 are plan views illustrating certain cam profiles.

Referring to FIGURE 23, it will be observed that the cam 219 affords three positions of the follower 125 and therefore of the lever 122. The outermost position of the follower 125 shown in FIGURE 23 effects disposition of the lever 122 in the dot and dash line position thereof shown in FIGURE 4, whereas the intermediate position of the follower 125 effects disposition of the lever 122 in the solid line position thereof shown in FIGURE 4. The innermost position of the follower 125 effects disposition of the lever 122 in the "rewind" position thereof shown in FIGURE 6.

Figure 24:
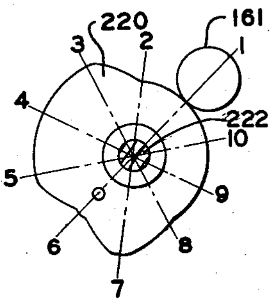

Referring to FIGURE 24, it will be observed that the cam 220 affords two positions for the cam following roller 161 and thereby of the arm 153 carrying pressure roller 156. The inner position of the follower 161 shown in FIGURE 24 effects disposition of the lever 153 in its advanced position shown in solid lines in FIGURE 4 and also shown in FIGURE 11 wherein the pressure roller 156 engages the capstan 13. The outermost position of the follower 161 effects disposition of the arm 153 in the retracted position thereof shown in dot and dash lines in FIGURE 4 and also shown in FIGURES 6 and 10.

Figure 25:
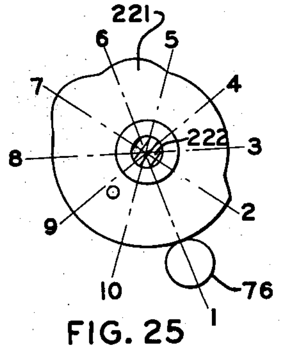

Referring to FIGURE 25, it will be observed that the cam 221 affords three positions for the cam following roller 76 and therefore of the lever 71. The intermediate position of the follower 76 shown in FIGURE 25 affords disposition of the lever 71 in the solid line position thereof shown in FIGURE 4, and when the follower 76 is in its innermost position, the lever 71 is disposed in the dot and dash line position thereof shown in FIGURE 4. When the follower 76 is in its outermost position, the lever 71 is disposed in the "rewind" position thereof shown in FIGURE 6.

Novel means is provided for effecting clockwise rotation of the cam shaft 222 in increments of 36 degrees, which increments are numbered from 1 to 10 in FIGURES 23 to 28. The aforementioned actuating means comprises a one-way ratchet dog clutch below the deck 3 having a lower member 226 fixed to the cam shaft 222 and having upwardly facing inclined teeth as best shown in FIGURE 8. An upper clutch member 227 complemental to the lower member 226 floats on the cam shaft 222 and is provided with an integral arm 228 which carries an upstanding pin 229 which projects through a suitable slot in the deck 3. A ratchet wheel 230 is fixed on the cam shaft 222 below the cam 223, and a pawl 231 pivoted at 232 and biased in a clockwise direction by a spring 233 into engagement with the ratchet wheel 230 prevents counterclockwise rotation of said ratchet wheel, the shaft 222 and the cams fixed thereto.

Fixed on the cam shaft 222 between the decks 2 and 3 is an indexing cam 234. Overlying the deck 3 is a generally T-shaped lever 235 mounted for horizontal swinging movement about a pivot 236. The member 235 is formed with a slot 237 for accommodating the upstanding ratchet arm pin 229, said member also carrying an upstanding stub shaft 238. Freely rotatable on the stub shaft 238 is an eccentric circular cam 239 which is formed with a peripheral groove to accommodate a rubber-like O ring or tire member 240. A tension spring 241 is suitably anchored at one end and has its other end attached to the member 235 to bias the latter in a clockwise direction and thereby bias the cam 239 into engagement with the knurled portion 15 (FIGURE 2) of the capstan 13.

Referring again to FIGURES 8 and 9, a lever 242 has a channel-shaped end portion 243 and is pivotally mounted on a fixed pin 244. The other end of the lever 242 carries an upstanding pin 245. A generally V-shaped link 246 is formed with a slot 247 adjacent its apex for accommodating the pin 245. One arm of the link 246 is pivotally connected to the member 235 as by pin 248, and the other arm of said link carries an upstanding cylindrical cam follower 249. A tension spring 250 connects the member 235 and the link 246 as shown in FIGURE 9. Suitably mounted on the deck 3 is a solenoid 251 having a plunger 252 engageable with the vertical wall of the channel-shaped portion 243 of lever 242, said solenoid being effective when energized to project the plunger 252 from its retracted position wherein the end portion thereof engages the lever portion 243 at the dot and dash line position of said lever shown in FIGURE 9 to the projected position of said plunger shown in FIGURE 9.

Referring to FIGURE 9, the indexing cam 234 is of circular configuration except for cutaway peripheral portions 253 and 254, and the cam follower 249 is adapted to coact with said cam. The clockwise rotation of the capstan shaft 13 causes counterclockwise rotation of the cam 239 held in contact therewith by the spring 241, and such rotation of cam 239 causes oscillating or swinging movement of the member 235 between the solid line and the dot and dash line positions thereof shown in FIGURE 9. Such oscillatory movement continues so long as the cam 239 remains in driving engagement with the capstan shaft 13. Movement of the member 235 toward its dot and dash line position causes movement of the ratchet arm pin 229 therewith and clockwise rotation of the upper ratchet member 227 through an angle of 36 degrees to effect like rotation of the cam shaft 222 and all of the cams fixed thereto. Return movement of the member 235 toward its solid line position returns the upper ratchet member 227 to its initial position for reengagement of its teeth with those of the lower ratchet member 226.

Movement of the member 235 toward its dot and dash line position pulls the cam follower 249 on link 246 into engagement with the periphery of the indexing cam 234, and if neither of the cutout portions 253 and 254 is presented to said follower, the oscillation of the member 235 continues. If, however, a cutout portion 253 or 254 is presented to the follower 249 when the member 235 approaches the dot and dash line position thereof, said follower moves into the presented cutout portion to the dot and dash line position shown in FIGURE 9. Such movement of the follower 249 permits the pin 245 to move to overcenter position with respect to a line connecting the pins 244 and 248, and the toggle provided by the link 246 and lever 242 is held in the overcenter dot and dash line position shown in FIGURE 9 by the bias of the springs 241 and 250. With the toggle in overcenter position, the member 235 is prevented from returning from its dot and dash line position, and the cam roller 240 rotates out of engagement with the capstan shaft 13. The parts of the actuating mechanism for the cam shaft 222 remain stationary until the solenoid 251 is subsequently energized to project the plunger 252 against the wall of the portion 243 of the lever 242 and pivot said lever counterclockwise from its dot and dash line position sufficiently to return the pin 245 overcenter. This breaks the toggle and permits the spring 241 to again pull the cam roller 239 into driving engagement with the capstan shaft 13 to thereupon initiate another cycle of oscillation.

Figure 21:
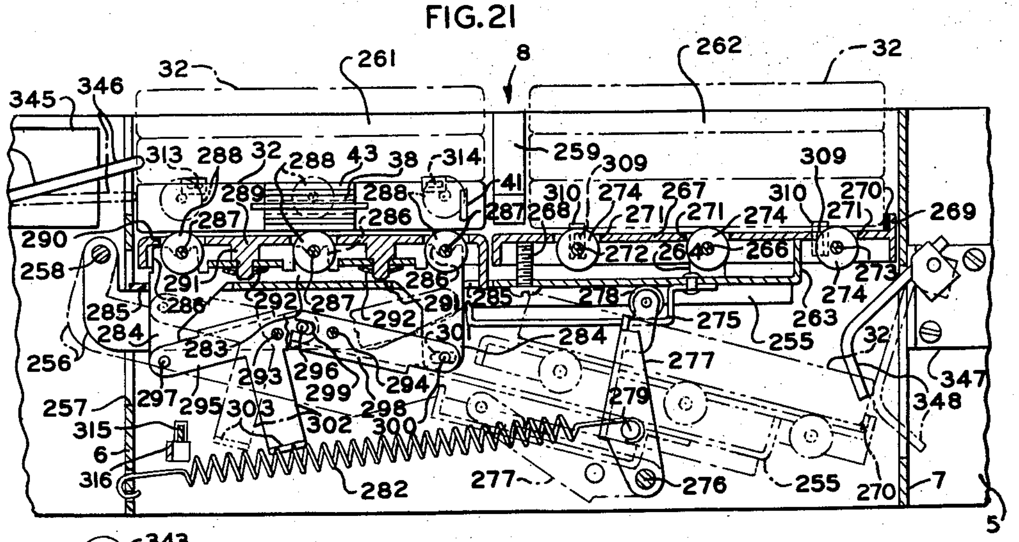
FIGURE 21 is a vertical sectional view taken generally along the line XXI—XXI of FIGURE 18.

Referring now to FIGURES 18 to 22, the improved cartridge storage and changer mechanism will now be described. The walls 4 and 5 are provided on their inner surfaces with vertical rib or guide members 259 and 260 (FIGURES 18 and 21) which divide the well formed by walls 4 to 7 into two side-by-side open bottomed compartments or magazines for the accommodation of cartridges 32. The magazines may be designated as a load magazine 261 and a storage magazine 262 as shown in FIGURE 21. Disposed within the well formed by the walls 4 to 7 is a rectangular frame member 255 of generally channel-shaped cross section having a pair of L-shaped ears 256 projecting from one end through a suitable opening 257 in the wall 6. The walls 4 and 5 support a horizontal shaft 258 to which the ears 256 are connected to afford a pivotal mounting for the frame 255. The frame member 255 has an upturned end flange 263 and is also formed with a pair of upstanding lugs 264 and 265 which support a cross shaft 266. A rectangular table member 267 having downturned side flanges is disposed upon the upturned flange 263 and is engaged by a screw 268 threaded through the frame member 255. The cross shaft 266 extends through the side flanges of the table member 267 to thereby afford a connection between said table member and the frame 255.

The table member 267 is formed adjacent the wall 7 with an upstanding flange 269 having a cushion strip 270, for example of foamed plastic, cemented to the inner surface thereof. The table member 267 is formed with a plurality, for example six, of rectangular openings 271, and the side flanges of the table member 271 support cross shafts 272 and 273 which, together with the shaft 266 each support two freely rotatable rollers 274 which may be of nylon or other suitable material. Each of the rollers 274 projects partially through an opening 271 and above the surface of the table member 267 into tangency with a common plane substantially parallel with the upper surface of said table as shown most clearly in FIGURE 21.

Fixed to the underside of the frame 255 is a generally U-shaped strap member 275. A horizontal shaft 276 is supported at its opposite ends by the walls 4 and 5 and affords a pivotal mounting for one end of the channel-shaped member 277 which carries a roller 278 at its outer end, said roller being disposed between the strap 275 and the underside of the frame 255 as shown in FIGURE 21. The member 277 carries a transverse pin 279 which extends through an arcuate slot 280 formed in the wall 4 and is connected to a triangular plate 281 (FIGURE 19) fixed on the shaft 276 externally of the wall 4. A spring 282 has one end connected to the pin 279 and has its other end suitably anchored to the wall 6 as shown in FIGURE 21, said spring being operative to bias the member 277 in a counterclockwise direction toward the dot and dash line position thereof. Movement of the member 277 from the solid line position to the dot and dash line position thereof shown in FIGURE 21 permits pivotal movement of the frame 255 and the elements mounted thereon to the inclined dot and dash line position thereof shown in FIGURE 21.

A generally channel-shaped frame member 283 overlies the upper surface of the frame 255 below the magazine 261 and the side flanges thereof terminate at each end in downwardly projecting legs 284 which extend freely through accommodating slots 285 formed in the frame member 255. The frame member 283 is formed along each side with preferably three upstanding lugs 286 having V-shaped upper end portions for accommodation of three cross shafts 287, each of which rotatably supports a pair of rollers 288 which may be identical with the rollers 274. A table member 289 overlies the frame member 283 and is formed with rectangular slots 290 for accommodation of the rollers 288. The table member 289 is provided with depending stepped pins 291 the tip portions of which project through suitable openings in the frame 283 and have friction washers 292 pressed thereon to secure the table 289 to the frame 283.

In FIGURE 21 the table 289 is in "play" position and the cartridge 32 placed on the rollers 288 thereof is in "play" position within the load magazine 261. Means is provided for elevating the table 289 with respect to the frame 255 and table portion 267 to the "load" position indicated by the dot and dash line positions of the rollers 288 in FIGURE 21. To this end, a pair of parallel horizontal transverse shafts 293 and 294 are supported at their opposite ends by the side flanges of the frame member 255. A generally channel-shaped lever 295 is pivoted on the shaft 293 and carries at one end a cross shaft 296. At the opposite end, the member 295 carries a cross shaft 297 which is pinned at its opposite ends to the adjacent pair of depending legs 284 of the frame 283. A generally channel-shaped lever 298 is pivotally mounted on the cross shaft 294, and the side flanges thereof are slotted at 299 to receive the cross shaft 296. The opposite end of the member 298 carries a cross shaft 300, the ends of which are accommodated in slots 301 formed in the adjacent depending legs 284 of the frame 283. The member 295 is formed with a depending arm 302 having an outturned ear 303 formed on its lower end.

A slide bar 305 is slidably mounted, adjacent the inner surface of the wall 4 on pins 304 which are accommodated within slots 306 (FIGURE 19). As shown in FIGURE 20, the slide bar 305 is formed with an inturned flange 307 positioned for engagement with the ear 303 of member 295. By sliding movement of the slide bar 305 to the left as viewed in FIGURE 19 to actuate the ear 303 of member 295 from the solid line to the dot and dash line position thereof shown in FIGURE 21, the members 295 and 298 are pivoted about the shafts 293 and 294 in clockwise and counterclockwise directions respectively, and are moved to the dot and dash line positions thereof to simultaneously effect raising of the table 289 to the raised "load" position indicated by the dot and dash line positions of the rollers 288. Upon return movement of the slide bar 305 toward the right, the table 289 and the associated parts return to the "play" position by gravity.

Mounted on the walls 4 and 5 at opposite sides of the storage magazine 262 are spring loaded pawls 308 having inwardly projecting tip portions 309 which project through accommodating openings 310 in the walls 4 and 5. As best shown in FIGURE 22, the tips 309 have upwardly angled lower surfaces and normally horizontal upper surfaces such that movement of a cartridge 32 upwardly therepast within the storage magazine 262 forces the pawls 308 outwardly, said pawls returning inwardly when cleared by the cartridge and preventing subsequent downward movement of said cartridge therepast. It will be observed in FIGURE 21, that the tips 309 of the pawls 308 are disposed just below the plane tangent to the rollers 274.

Pivotally mounted on the side walls 4 and 5 at opposite sides of the load magazine 261 are elongated pawls 311, 312, 313 and 314 the inturned upper ends of which are accommodated within suitable apertures in said walls. As best shown in FIGURES 20 and 21, the upper surfaces of the inturned ends of the pawls 311 to 314 are disposed in or slightly below the plane of the upper surface of the cartridge 32 disposed in "play" position in the load magazine 261. The pawls 313 and 314 may be formed from a single stamping which has an inwardly extending bar 315 projecting through a suitable aperture in the wall 5. The pawl 312 is formed with a similar bar 316 having a transversely bent end portion 317 overlying the inner end of the bar 315. A compression spring 318 is interposed between the lower end of the pawl 313 and biases the upper ends of the pawls 313 and 314 inwardly to the position thereof shown in FIGURE 18 and in solid lines in FIGURE 20. The spring 318 acting through the bars 315 and 316 also biases the pawl 312 inwardly to the position thereof shown in FIGURE 18 and in solid lines in FIGURE 20. A spring 319 biases the pawl 311 inwardly to the position thereof shown in FIGURE 18. A pair of crank members 320 and 321 are pivotally mounted on pins 322 and 323 depending from the deck 3, said crank members having arms positioned for engagement with the lower ends of the pawls 312 and 311 respectively, and having other ams pinned to a bar 324 as shown in FIGURES 18 and 19. Movement of the bar 324 toward the right to cause pivoting of the cranks 320 and 321 counterclockwise to the dot and dash line positions thereof shown in FIGURE 18, effects retractile movement of the inturned tips of all of the pawls 311 to 314 from the interior of the load magazine 261 against the bias of the springs 318 and 319. FIGURE 20 illustrates in dot and dash lines the retracted positions of the pawls 312 and 313. When the pawls are thus retracted, a cartridge 32 can freely move therepast within the load magazine 261.

Figure 28:
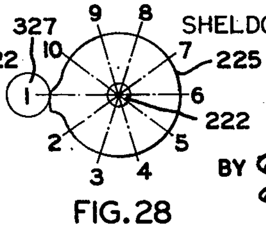

Means is provided for actuating the bar 324 to effect actuation of the pawls 311 to 314, said means comprising a lever 325 pivoted on a pin 326 depending from the deck 3. The lever 325 is pivoted at one end to the adjacent end of the bar 324, and at its other end carries a cam following roller 327 cooperable with the cam 225 fixed on the cam shaft 222 below the deck 3. As shown in FIGURES 18 and 28, the cam 225 is essentially circular and has a raised portion 328. The contour of the cam 225 is such that the lever 325, bar 324 and pawls 311 to 314 are positioned so that the tips of the pawls are projected into the load magazine 261 at all times except when the portion 328 of the cam 225 engages the follower 327 and moves the same to the dot and dash line position thereof shown in FIGURE 18. The bias of the springs 318 and 319 acting through the linkage described maintains the follower 327 in engagement with the periphery of the cam 225.

Figure 27:
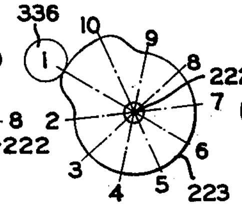

Raising and lowering of the table 289 with respect to the table 267 and frame 255 is effected by means of a crank 329 pivoted on a pin 330 which depends from the deck 3. The crank 329 has an arm 331 having a tip portion 332 of reduced width which extends through a suitable opening in the wall 4 and into an opening 333 in the slide bar 305 as best shown in FIGURES 19 and 20. The arm 331 is also formed with an upstanding flange 334 at one edge thereof intermediate its length. Crank 329 also has an arm 335 which carries a cam following roller 336 which is cooperable with the cam 223 on the cam shaft 222. As shown in FIGURES 18 and 27, the cam 223 is basically circular and has a raised peiripheral portion 337. The weight of the table 289, frame 283 and of the associated linkage, acting through the slide bar 305 and crank 329 maintains the roller 336 in contact with the periphery of the cam 223. Engagement of the raised portion 337 of cam 223 by roller 336 pivots the crank 329 to the dot and dash line position thereof shown in FIGURE 18 with resultant raising of the table 289 to the "load" position thereof indicated by the dot and dash line position of the rollers 288 in FIGURE 21. At all times except when the portion 337 of cam 223 engages roller 336, the table 289 is disposed substantially flush with the table 267 so that together they form a single platform and all of the rollers 274 and 288 are substantially tangent to the same plane.

Figure 26:
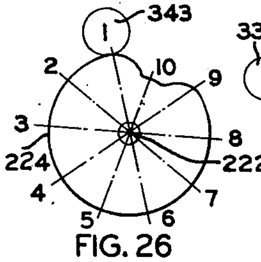

Movement of the frame 255 and the associated tables 267 and 289 therewith to and from the inclined dot and dash line position shown in FIGURE 21 is under the control of a linkage including a link 338 pinned as at 339 to the triangular plate 281 and also pinned to one arm of a crank 340 as at 341. The crank 340 is pivoted on a pin 342 depending from the deck 3, and the other arm of said crank carries a cam following roller 343 cooperable with the cam 224 on the cam shaft 222. As shown in FIGURES 18 and 26, the cam 224 is basically circular and has a cutaway peripheral portion 244. The bias of the spring 282 acting through the arm 277, shaft 276, plate 281, link 338 and crank 339 maintains the roller 343 in contact with the periphery of the cam 224. At all times except when a portion of the cutaway 344 is presented to the cam follower 343, the frame 255 and tables 267 and 289 are in the horizontal position. Rotation of the cam 224 sufficient to present the cutaway portion 344 to the follower 343 permits the bias of the spring 282 to move the arm 277, frame 255 and tables 267 and 289 to the inclined dot and dash line positions thereof shown in FIGURE 21.

Mounted on the wall 4 is a normally open switch 345 having a sensing arm 346 which extends through a suitable opening in the wall 6 and is positioned for engagement by a cartridge 32 disposed in "load" position, said arm being swingable downwardly by placement of a cartridge on the rollers 288 when the latter are in raised "load" position, and such downward movement of the arm 346 being effective to close the contacts of said switch. The switch arm 346 is retained in the down position so long as there is a cartridge 32 in either "load" or "play" position in the magazine 261. The switch 345 has embodied therein biasing means returning the arm 346 to its raised open contact position when said arm is not engaged by a cartridge in the magazine 261.

A normally open switch 347 is mounted on the wall 7 and is provided with a swingable sensing arm 348 which extends through a suitable opening in the wall 7 into the storage magazine 262. As shown in FIGURE 18, the table 267 is formed with a slot 349 for free accommodation of the switch arm 348 without actuation thereof by the table and frame mechanism when the latter is moved to and from its inclined dot and dash line position shown in FIGURE 21.

Suitably mounted on the underside of the deck 3 is a normally open switch 350 (FIGURE 18) having a plunger 351 biased outwardly to the position thereof shown in said figure. The plunger 351 is positioned for actuation by the flange 334 of the crank 329 such that movement of said crank to the dot and dash line position of FIGURE 18 caused the flange 334 to depress the plunger 351 to and thereby close the contacts of switch 350.

Figure 17:
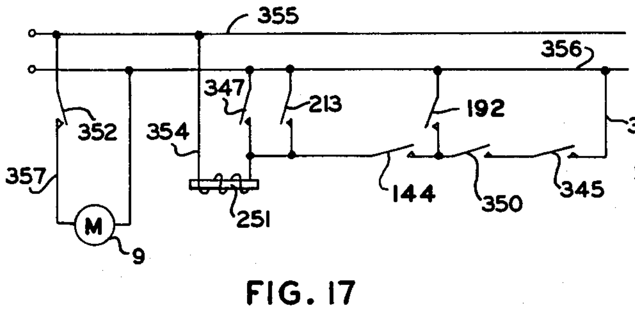
FIGURE 17 is a schematic diagram of the electrical circuit for the improved recorder-reproducer.

Referring to FIGURE 17, it will be observed that the electrical circuit for the improved recorder-reproducer comprises a conductor 354 connected at one end to a line conductor 355 and its other end to a line conductor 356.

Interposed in the conductor 354 are the solenoid 251 and switches 144, 350 and 345 in series circuit relation. Switches 213 and 347 each have one terminal thereof connected to the line conductor 356 and the other terminal thereof connected to the conductor 354 between the solenoid 251 and switch 144. One terminal of the switch 192 is connected to the line conductor 356 and the other terminal thereof is connected to the conductor 354 between the switches 144 and 350. A conductor 357 has one end connected to the line conductor 355 and has its other end connected to the line conductor 356, the conductor 357 having the motor 9 and an off-on switch 352 interposed therein in series circuit relation. The switch 352 may be provided with a knob 353 which projects from the top of the case 1 as shown in FIGURE 1.

*Operation*

At the beginning of a cycle, the "start" key 146 is up, and the parts of the apparatus are in "load" position, the cams 219 to 224 being positioned with respect to their respective followers as shown in FIGURES 23 to 28. The frame 255 and table 267 are in horizontal position, and the pawls 311 to 314 are retracted from the load magazine 261. The table 289 is in raised "load" position, and the switch 350 is actuated to closed position by engagement of the flange 334 with the plunger 351. All of the switches except the switch 350 are open, and the motor switch is closed to start the motor 9 at the will of an operator by manual actuation of the knob 353. The drive-out-rewind roller 48 is in the advanced position and is not rotating. The parts of the leader sensing mechanism are disposed as shown in FIGURES 12 and 13, and the pressure roller 156 is out of contact with the capstan 13. The clutch pulley 20 is in its lowermost or disengaged position, since the levers 134 and member 129 are in the dot and dash line positions thereof shown in FIGURE 4, and no torgue can be supplied to the take-up reel 19, although the capstan 13 and pulleys 16, 20, 21, 23 and 27 are rotating in the directions indicated in FIGURE 4. The parts of the drive mechanism shown in FIGURE 9 are in the dot and dash line positions thereof and the cam shaft 222 is therefore at rest.

Placement of a cartridge 32 in the load magazine 261 on the rollers 288 causes closure of the switch 345, however, since the switch 144 is open, no current can flow to the solenoid 251.

Upon depression of the start key 146, the slide member 138 is moved inwardly to thereby actuate the lever 134 from the dot and dash line position to the solid line position thereof shown in FIGURE 4 and also to pivot the crank 162 from the dot and dash line position thereof to the solid line position thereof shown in FIGURE 6. Such movement of the crank 162 moves the upstanding lug 163 out of engagement with the arm 153 to thereby cause retraction of the drive-out-rewind roller 48 and advancement of pressure roller 156 into contact with the capstan 13. The aforementioned pivoting of the lever 134 effects closure of the switch 144 and movement of the portion of the lever 134 over the portion 131 of the arm 129 of member 122 to actuate the clutch pulley 20 to its uppermost or high torque position. This completes the circuit to the solenoid 251 whereupon the plunger 252 thereof (FIGURE 9) actuates the lever 242 to move the parts of the toggle mechanism to the solid line position thereof shown in said figure. This brings the roller 239 into engagement with the knurled portion 15 of the capstan shaft 13 which rotates said cam 239 counterclockwise to cause rotation of the cam shaft 222 36 degrees in a clockwise direction from the position 1 shown in FIGURES 23 and 28 to the position 2 indicated therein. Such rotation causes inward movement of the follower 336 (FIGURE 27), to cause controlled and gentle lowering of the table 289 with the cartridges 32 thereon to the "play" position shown in FIGURE 21, opening the switch 350 and thereby deenergizing the solenoid 251. After lowering of the table 289 has been initiated, the follower 327 (FIGURE 28) moves inwardly to effect advancement of the pawls 311 to 314 into the magazine 261. Since upon rotation of cam shaft 222 36 degrees to position 2, the toggle linkage of FIGURE 9 is prevented from moving to overcenter position, rotation of said cam shaft continues another 36 degrees toward position 3 shown in FIGURES 23 to 28.

Movement of the cam shaft 222 to position 3 also causes the cam follower 76 (FIGURE 25) to move inwardly toward its innermost position and the cam follower 161 (FIGURE 24) to move outwardly toward its outermost position. This action imparts retractile movement to the arm 153 and pressure roller 156 and advancing movement to the driveout-rewind roller 48 to the dot and dash line position shown in FIGURE 4 and the solid line position thereof shown in FIGURES 6 and 10 following lowering of the table 289. In this position the drive-out-rewind roller engages the portion 38*a* of the leader 38 wound on the peripheries of the flanges of the reel 34 in the cartridge 32. By the cam rotation to position 3 the lever 71 is pivoted to the dot and dash line position thereof shown in FIGURE 4, permitting the pulley 23 to swing toward the advancing drive-out-rewind roller 48 under the tension of the belt 31, bringing said belt into driving engagement with said roller to cause counterclockwise rotation of the latter.

The roller 48 thereupon pushes the leader 38 in the direction to unwind said leader from the cartridge or supply reel 36, said leader being guided toward the take-up reel 19 by the grooves 170 and 171 in the upper and lower guide plates 168 and 169 (FIGURE 13). The cam shaft 222 continues to be advanced clockwise in increments of 36 degrees through the position 5 shown in FIGURES 23 to 28, allowing time for the leader to enter the take-up reel 19 between the flanges 79 and 92 thereof and have its opposite edges frictionally gripped by said flanges as the flange 92 is raised thereby against the bias of the spring 86. The take-up reel 19 is rotated at a rate such that the peripheral velocity of the hub member 80 is substantially greater than the velocity at which the leader 38 is moved into said take-up reel. As a result of the novel coaction of the reel 19 and leader 38 the clockwise rotation of the reel 19 causes the leader 38 to be wound onto the hub member 80 thereof. The annular guiding and deflecting member 100 prevents inadvertent escape of the leader 38 from between the flanges of the take-up reel when the leader 38 is fed thereto.

Figure 5:
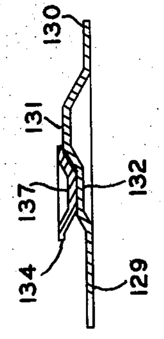
FIGURE 5 is an enlarged fragmentary vertical sectional view taken along the line V—V of FIGURE 4.

Upon rotation of the shaft 222 from position 5 toward position 6 shown in FIGURES 23 to 28, the follower 125 moves to its intermedaite position, shifting the member 122 to the solid line low torque position thereof shown in FIGURES 4 and 5. At the same time, follower 161 moves to its inner position advancing the member 153 and pressure roller 156 to their positions shown in FIGURE 11 wherein the pressure roller 156 engages the magnetic tape, pressing the same against the capstan 13 and at the same time retracting the drive-out-rewind roller 48. Advancing movement of the member 153, acting through the upstanding lugs 159, pivots the pin 185

(FIGURE 6) clockwise and rotates the shaft 184 to load the torsion spring 188, which thereupon causes clockwise swinging movement of the member 183 from its position shown in FIGURE 10 to the position thereof shown in FIGURE 11 wherein the guide pins 182 draw the tape 37 into engagement with the magnetic heads 172 and 173 as shown in FIGURE 11. Such movement of the pins 182 permits the spring 179 to rotate the pressure pad member 175 toward the head 173 and cause the pad 177 to press the tape 37 against said head as shown.

Further, movement of the cams to position 6 causes the follower 76 to be moved to its intermediate position, pivoting the member 71 from its dot and dash line position to its solid line position shown in FIGURE 4 wherein the upstanding lug 74 of said member engages the arm 25 to hold the pulley 23 and belt 31 away from the retracted roller 48. The apparatus is now in "play" or "record" position and upon arrival of the cam shaft 222 at position 6, a cutaway portion of the indexing cam 234 is presented to the follower 249, whereupon the toggle linkage of FIGURE 9 moves to overcenter position and the cam shaft 222 comes to rest. It will be observed in FIGURE 3 that the leader 38 when wound on the take-up reel 19 is accommodated in the annular space surrounding the hub ring 80 and radially inwardly of the offset portions 95, the upper flange 92 having returned axially toward the flange 79 from the raised position to which it had been moved by entry of the leader 38 between the flanges 79 and 92. The return movement of the flange 92 is effected by the bias of spring 86. In the position shown in FIGURE 3 the inner surfaces 96 and 97 of the flanges 79 and 92 are spaced apart a distance only slightly greater than the width of the tape 37 being wound on the take-up reel.

If, while the parts of the apparatus are in play-record position, the stop key 147 is depressed, the start key and its associated parts are returned to their initial "off" positions. More particularly, the slide bar 138 is retracted and the lever 134 is pivoted to the dot and dash line positions thereof shown in FIGURE 4 to effect opening of the switch 144. This movement of lever 134 also moves the portion 137 of the lever 134 off of the raised portion 132 of the member 122 and onto the lower surface 129 of the end portion 130 of said member to effect lowering of the clutch pulley 20 to its lowermost disengaged position. Rottaion of the take-up reel thereupon ceases. Retraction of the slide bar 138 has the further effect of pivoting the crank 162 (FIGURE 6) to the dot and dash line position thereof, such movement causing the upstanding leg 163 to engage the arm 153 and cause retraction thereof with the result that the drive-out-rewind roller 48 moves into engagement with the periphery of the supply reel 34 to brake the reel against tape spillage. Retraction of the arm 153 also returns the member 183 (FIGURE 11) and the pins 182 carried thereby to the positions thereof shown in FIGURE 10, retracting the pressure pad member 175 during such movement. While such movement of the member 183 by engagement of the projection 190 with the arm 191 causes momentary closure of the contacts of the switch 192 (FIGURE 1), such closure does not effect energization of the solenoid 251 since the switch 144 is moved to open position before the switch 192 is closed. Subsequent depression of the start key returns the parts to the "play" positions they occupied prior to depression of the stop key.

The parts of the apparatus remain in the "play" or "record" position shown in FIGURE 11 until all of the leader and tape have been transported to the take-up reel and the trailer 39 is wound onto the take-up reel. When no more trailer is available for withdrawal from the cartridge or supply reel 34, the pull exerted on the trailer by the coaction of the pressure roller 156 and capstan 13 exerts substantially increased tension on the portion of the trailer extending between the capstan and the hub of the reel 34 to which the trailer 39 is fixed. This increased tension, acting on the pins 182, pulls the member 183 from the position of FIGURE 11 to the position of FIGURE 10. Switch 192 is actuated during this movement by engagement of the projection 190 on the member 183 with the switch arm 191 and upon the resultant completion of the electrical circuit to the solenoid 251, the toggle linkage of FIGURE 9 is broken and the cam shaft 222 is advanced another 36 degrees toward position 7 of FIGURES 23 to 28 stopping thereat as the result of overcenter travel of the toggle linkage of FIGURE 9.

This movement of the cams moves the follower 125 to its innermost position to thereby move the member 122 to the "rewind" position thereof shown in FIGURE 6 wherein the portion 137 of lever 134 is moved out of engagement with the raised surface portions 131 and 132 of the lever 122 to thereby disengage the clutch on the take-up reel and simultaneously to move the upstanding lug 127 on the member 129 into engagement with the adjacent end of the U-shaped lever 215 (FIGURES 1 and 2). Pivoting the lever 215 clockwise retracts the end 216 thereof from the upstanding lug 207 of the sensing member 201 as shown in FIGURES 14 and 15. As shown in FIGURE 15, retraction of the end portion 216 from the lug 207 causes clockwise movement of the member 201 about shaft 199 to bring the inner edge surface of the jaw portion 203 thereof into minimum spaced relation with respect to the inner edge surface of the jaw portion 202 of the member 200.

Movement of the cam 220 to position 7 causes movement of the follower 161 to its outer position to cause retractile movement of the arm 153 and pressure roller 156 and simultaneous advancement of the drive-out-rewind roller 48 into engagement with the peripheries of the flanges 36 of the reel 34 while at the same time the arm 183 and pins 182 are held in the positions thereof shown in FIGURE 10 by pin 185 and lugs 159.

Rotation of the cam 221 to the position 7, moves the follower 76 to its outermost position to thereby pivot the member 71 clockwise to its "rewind" position shown in FIGURE 6, wherein the projection 72 on the member 71 engages the pin 64 and holds the triangular plate 62 rotated counterclockwise against the bias of spring 69 to the position thereof shown in FIGURE 6. Such positioning of the plate 62, acting through the link 66 and spring 68 pulls the rewind idler 61 into engagement with both the motor drive wheel 11 and the advanced drive-out-rewind roller 48. The roller 48 is rotated clockwise by the idler 61, and by virtue of its engagement with the reel flanges 36, it rotates the reel 34 counterclockwise to effect high speed rewinding of the trailer 39, tape 37 and leader 38 onto said reel. Such rewind, of course, causes counterclockwise rotation of the take-up reel 19 which is free to thus rotate, since the clutch thereof is disengaged.

The rewind operation continues until the leader 38 passes between the jaw portions 202 and 203 of sensing members 200 and 201 and is slidably gripped thereby to cause movement of the sensing members against the bias of spring 210 to the position thereof shown in FIGURE 14. Upon movement of the leader 38 out of engagement with the jaw portions 202 and 203, the sensing members 200 and 201 return to the position thereof shown in FIGURE 12 under the bias of the spring 210, and in so doing actuate the switch 213 by engagement of the sear 211 with the switch arm 214. Closure of the switch 213 energizes the solenoid 251 to again break the toggle linkage of FIGURE 9 and permit rotation of the cam shaft 222 toward position 8 shown in FIGURES 23 to 28.

During rotation of the cam 219 (FIGURE 23) to position 8, the follower 125 is moved to its outermost position pivoting the member 122 to its dot and dash line position shown in FIGURE 4 wherein the portion 131 thereof is moved under the portion 137 of the lever 134 to re-engage the take-up reel clutch in high torque position. Such movement of the member 122 also withdraws the upstanding lug 127 from the U-shaped lever 215 to permit advancement of the end portion 216 thereof into engagement with the upstanding lug 207 of sensing member 201 for counterclockwise pivotal movement of said lever against the bias of spring 209 to the position thereof shown in FIGURE 13, such movement of the lever 215 being effected by the bias of the spring 218 (FIGURE 2).

Rotation of the cam 220 (FIGURE 24) to the position 8 returns the follower 161 to its inner position to effect advancing movement of the member 153 and pressure roller 156 and retractile movement of the drive-out-rewind roller 48. Rotation of the cam 221 (FIGURE 25) to position 8 causes movement of the follower 76 to its intermediate position, permitting the member 71 to return to the intermediate position thereof shown in solid lines in FIGURE 4, wherein the bias of the spring 69 moves the rewind idler 61 out of engagement with the drive-out-rewind roller 48.

Rotation of the cam shaft 222 continues through position 9, at which point the follower 343 (FIGURE 26) moves inwardly toward its innermost position as the cutout portion 344 of cam 224 is presented thereto. This causes downward tilting of the frame 255, together with platforms 267 and 289 to the dot and dash line position thereof shown in FIGURE 21. The cartridge 32 which was disposed upon the rollers 288 in "play" position in the magazine 261 now moves by gravity on the rollers 288 and 274 along the inclined platform and into engagement with the cushion 270. As the last-mentioned cartridge 32 reaches the end of the incline, it engages the switch arm 348 and moves the same to the dot and dash line closed position shown in FIGURE 21. The remaining cartridges on the load magazine 261 are retained therein by the pawls 311 to 314 at this time.

Rotation of the cam shaft 222 to position 10 also causes the follower 336 (FIGURE 27) to be moved outwardly to close the switch 350 and move the slide bar 305 (FIGURES 18 and 19) toward the left. However, because of the fact that the frame 255 is inclined, said bar has no substantial actuating effect on the arm 302 so that the table 289 remains substantially flush with the table 267.

The indexing cam 234 is shaped to terminate rotation of the cam shaft 222 at position 10. However, upon actuation of the switch 347 the cartridge 32 reaching the lower end of the incline, the circuit to the solenoid 251 is completed and the toggle linkage of FIGURE 9 is thereby again broken to permit further rotation of the cam shaft toward position 1, thereby causing outward movement of the follower 343 (FIGURE 26) and return of the changer frame 255 together with platform 267 to the horizontal solid line position thereof shown in FIGURE 21. This action lifts the cartridge at the end of the incline upwardly into the storage magazine 262 past the tips 309 of the pawls 308 which thereafter prevent downward movement of said cartridge therepast. It will be observed that the switch 347 serves as an interlock preventing raising of the inclined platform until the played cartridge reaches the lower end of the inclined platform.

During raising of the frame 255 toward the horizontal position, the ear 303 of member 295 engages the slide bar flange 307 to cause actuation of the pivotal members 295 and 298 to the dot and dash line positions thereof shown in FIGURE 21 as the frame 255 reaches its horizontal position. This raises the platform 289 to its "load" position indicated by the dot and dash line positions of the rollers 288 in FIGURE 21, in which position said rollers engage the undersurface of the cartridge 32 resting on the tips of the pawls 311 to 314. Rotation of the cam 225 (FIGURE 28) to position 1 moves the follower 327 outwardly to effect retraction of the pawls 311 to 314 from the magazine 261. Upon arrival of the cam shaft 222 at position 1, the playing and changing cycle is complete, and since the cartridge 32 resting on the rollers 288 at the "load" position maintains the switch 345 actuated, a new cycle of operation is initiated.

The cartridges stacked in the load magazine 261 are all played automatically and in sequence and are sequentially transferred to the storage magazine 262. When the last cartridge in the magazine 261 moves out of engagement with the switch 345, no further cycling takes place because the electrical circuit to the solenoid 251 is incomplete at the switch 345.

Having thus described a self-threading magnetic tape recording and reproducing apparatus as one specific embodiment of the invention, it should be understood that the illustrated embodiment was selected to facilitate the disclosure and is not intended to place unnecessary limitation on the claims or to confine the invention to a particular use. Various changes and modifications may be made in the illustrated embodiment without departing from the spirit of the invention, and all of such changes are contemplated as may come within the scope of the appended claims.

What is claimed as the invention is:

1. In combination, a take-up reel having a hub portion and a pair of parallel side flanges, at least one of said flanges being axially movable, means defining a minimum spacing between said flanges, means biasing said at least one flange axially toward a normal position affording said minimum spacing between said flanges, means for rotating said reel, an elongated extent of relatively stiff flexible band material having a width greater than said normal flange spacing, and means for introducing one end of said extent between said reel flanges with the opposite edegs of said extent engaging said side flanges respectively to cause axial movement of said at least one flange against said biasing means and frictional engagement of said opposite edges of said extent by said flanges, whereupon said rotation of said reel causes winding of said extent on said hub between said flanges.

2. In combination, a take-up reel having a hub portion and a pair of parallel side flanges, at least one of said flanges being axially movable, means defining a minimum spacing between said flanges, means biasing said at least one flange axially toward a normal position affording said minimum spacing between said flanges, at least one of said flanges having an inner surface flaring axially outwardly adjacent the periphery of said flange, means for rotating said reel, an elongated extent of relatively stiff flexible band material having a width greater than said normal flange spacing, and means for introducing one end of said extent between said reel flanges with the opposite edges of said extent engaging said side flanges respectively to cause axial movement of said at least one flange against said biasing means and frictional engagement of said opposite edges of said extent by said flanges, whereupon said rotation of said reel causes winding of said extent on said hub between said flanges.

3. In combination, a take-up reel having a hub portion and a pair of parallel side flanges, at least one of said flanges being axially movable, means defining a minimum spacing between said flanges, means biasing said at least one flange axially toward a normal position affording said minimum spacing between said flanges, means for rotating said reel, an elongated extent of relatively stiff flexible band material having a width greater than said normal flange spacing, means for introducing one end of said extent between said reel flanges with the opposite edges of said extent engaging said side flanges respectively to cause axial movement of said at least one flange against said biasing means and frictional engagement of said opposite edges of said extent by said flanges, and an arcuate deflecting and retaining member disposed between said reel flanges adjacent the peripheries thereof in a position to prevent escape of the leading end of said leader from between said flanges, whereupon said rotation of said reel causes winding of said extent on said hub between said flanges.

4. In combination, a take-up reel having a hub portion and a pair of parallel side flanges, at least one of said flanges being axially movable, means defining a minimum spacing between said flanges, means biasing said at least one flange axially toward a normal position affording said minimum spacing between said flanges, said at least one biased flange being removably mounted with respect to said reel, means for rotating said reel, an elongated extent of relatively stiff flexible band material having a width greater than said normal flange spacing, and means for introducing one end of said extent between said reel flanges with the opposite edges of said extent engaging said side flanges respectively to cause axial movement of said at least one flange against said biasing means and frictional engagement of said opposite edges of said extent by said flanges, whereupon said rotation of said reel causes winding of said extent on said hub between said flanges.

5. In combination, a take-up reel having a hub portion and a pair of parallel side flanges, at least one of said flanges being axially movable, means defining a minimum spacing between said flanges, means biasing said at least one flange axially toward a normal position affording said minimum spacing between said flanges, means for rotating said reel, an elongated extent of flexible tape having a width somewhat less than said minimum flange spacing, an elongated leader of relatively stiff flexible band material attached to one end of said tape and having a free end portion having a width greater than said normal flange spacing, means for introducing said leader between said reel flanges with the opposite edges of said wide leader portion engaging said side flanges respectively to cause axial movement of said at least one flange against said biasing means and frictional engagement of said opposite edges of said wide leader portion by said flanges, whereupon said rotation of said reel causes winding of said leader on said hub between said flanges, at least one of said flanges being formed adjacent said hub with an annular recessed inner surface portion affording accommodation of said wide leader portion and permitting return of said flanges to said normal minimum spacing when said wide leader portion is completely wound on said hub.

6. In combination, a take-up reel having a hub portion and a pair of parallel side flanges, at least one of said flanges being axially movable, means defining a minimum spacing between said flanges, means biasing said at least one flange axially toward a normal position affording said minimum spacing between said flanges, an elongated extent of relatively stiff flexible band material having a free end portion of a width greater than said normal flange spacing, means for introducing said free end portion of said extent between said reel flanges at a predetermined velocity with the opposite edges of said extent engaging said side flanges respectively to cause axial movement of said at least one flange against said biasing means and frictional engagement of said opposite edges of said extent by said flanges, and means for rotating said reel at a rate such that the velocity of the circumferential surface of said sub exceeds said predetermined velocity of said extent, to cause winding of said extent on said hub between said flanges.

7. In a machine having a supply reel having spaced circular side flanges and wound with relatively limp tape, a take-up reel, guiding means defining a predetermined path between said reels, a relatively stiff leader attached to the free end of said tape and also wound on said supply reel, the combination of a drive-out-rewind and brake roller movable between operative and retracted positions with respect to said supply reel and engageable with a portion of said leader on said supply reel when in operative position, releasable forward drive means engageable with said roller when the latter is in operative position for rotation thereof in a direction to push said leader off said supply reel and along said path toward said take-up reel in a threading operation, said roller when in operative position being engageable with at least one of said reel flanges upon transport of said leader off said reel, and releasable rewind drive means engageable with said roller when the latter is in operative position for rotation thereof in the opposite direction to thereby cause rotation of said supply reel in the direction to rewind said tape and leader thereon, said roller when in operative position and not engaged by either of said drive means having braking engagement with said supply reel.

8. In a machine having a supply reel wound with relatively limp tape, a take-up reel, means defining a predetermined path between said reels, a relatively stiff leader attached to the free end of said tape and also wound on said supply reel, means for effecting transport of said leader from said supply reel along said path to said take-up reel, and means for effecting winding engagement of said leader on said take-up reel upon transport of the leading end thereof to said take-up reel, the combination of shiftable drive means for said take-up reel having a first position affording a relatively high torque drive for said take-up reel and having a second position affording a reduced torque drive for said take-up reel, and shifting means effecting disposition of said drive means in said first position during transport of said leader and winding thereof on said take-up reel and for subsequently shifting said drive means to said second position to avoid subjection of said tape to deleterious stresses.

9. In a machine having a supply reel wound with relatively limp tape, a take-up reel, means defining a predetermined path between said reels, a relatively stiff leader attached to the free end of said tape and also wound on said supply reel, means for effecting transport of said leader from said supply reel along said path to said take-up reel, and means for effecting winding engagement of said leader on said take-up reel upon transport of the leading end thereof to said take-up reel, the combination of shiftable driven means for said take-up reel comprising first and second clutch members each movable to engaged and disengaged positions with respect to a cooperating member, said drive means having a first position affording a relatively high torque drive for said take-up reel in which first position both of said clutch members are in engaged position, said drive means also having a second position affording a reduced torque drive for said take-up reel in which second position one of said clutch members is in disengaged position and the other is in engaged position, and shifting means effecting disposition of said drive means in said first position during transport of said leader and winding thereof on said take-up reel and for subsequently shifting said drive means to said second position to avoid subjection of said tape to deleterious stresses.

10. In a machine having a supply reel wound with relatively limp tape, a take-up reel, means defining a predetermined path between said reels, a relatively stiff leader attached to the free end of said tape and also wound on said supply reel, means for effecting transport of said leader from said supply reel along said path to said take-up reel, and means for effecting winding engagement of said leader on said take-up reel upon transport of the leading end thereof to said take-up reel, the combination of shiftable drive means for said take-up reel comprising first and second clutch members each movable to engaged and disengaged positions with respect to a cooperating member, said drive means having a first position affording a relatively high torque drive for said take-up reel in which first position both of said clutch members are in engaged position, said drive means also having a second position affording a reduced torque drive for said take-up reel in which second position one of said clutch members is in disengaged position and the other is in engaged position, said drive means also having a third position in which both of said clutch members are in disengaged position to render said drive means inoperative, and shifting means effecting disposition of said drive means in said first position during transport of said leader and winding thereof on said take-up reel and in said second position following winding of said leader on said take-up reel, thereby avoiding subjection of said tape to deleterious stresses.

11. In a machine having a supply reel wound with relatively limp tape, a take-up reel, guiding means defining a predetermined path between said reels, and a relatively stiff leader attached to the free end of said tape and also wound on said supply reel, the combination of drive-out-rewind roller means engageable with a portion of said leader on said supply reel, releasable forward drive means for said roller means operative to cause said roller means to push said leader off said supply reel and along said path toward said take-up reel in a threading operation, said roller means being engageable with said supply reel upon transport of said leader off said reel, and releasable rewind drive means for said roller means operative to cause said roller means to rotate said supply reel in the direction to rewind said tape and leader thereon.

12. In combination, a supply reel wound with relatively limp tape; a relatively stiff leader attached to the free end of said tape and also wound on said supply reel; a take-up reel having a hub portion and a pair of parallel side flanges, at least one of said flanges being axially movable, means defining a minimum spacing between said flanges, means biasing said at least one flange axially toward a normal position affording said minimum spacing betwen said flanges; drive means for rotating said take-up reel; and means for advancing said leader from said supply reel between said flanges with the opposite edges of said leader engaging said side flanges respectively to cause axial movement of said at least one flange against said biasing means and frictional engagement of said opposite edges of said leader by said flanges, whereupon said rotation of said reel causes winding of said leader on said hub between said flanges.

13. In combination, a take-up reel having a hub portion and a pair of parallel side flanges, means defining a minimum spacing between said flanges, at least one of said flanges being axially movable, means biasing said at least one flange axially toward a normal position affording said minimum spacing between said flanges, an elongated extent of flexible tape having a width somewhat less than said minimum flange spacing, an elongated leader of relatively stiff flexible band material attached to one end of said tape and having a width greater than said normal flange spacing, means for introducing one end of said leader between said reel flanges at a predetermined velocity with the opposite edges of said leader engaging said side flanges respectively to cause axial movement of said at least one flange against said biasing means and frictional engagement of said opposite edges of said leader by said flanges, and shiftable drive means having a first position for rotating said reel at a relatively high torque and at a rate such that the velocity of the circumferential surface of said hub exceeds said predetermined velocity of said leader to cause winding of said leader on said hub between said flanges, and said drive means having a second position for rotating said reel at a reduced torque to avoid subjection of said tape to deleterious stresses.

14. In a machine having a supply reel having spaced circular side flanges and wound with tape, a take-up reel, guiding means defining a predetermined path between said reels, and a relatively stiff leader attached to the free end of said tape and also wound on said supply reel, the combination of a drive-out-rewind roller movable between operative and retracted positions with respect to said supply reel and engageable with a portion of said leader on said supply reel when in operative position, releasable forward drive means engageable with said roller when the latter is in operative position to cause said roller to push said leader off said supply reel and along said path toward said take-up reel in a threading operation, said roller when in operative position being engageable with at least one of said reel flanges upon transport of said leader off said reel, and releasable rewind drive means engageable with said roller when the latter is in operative position for rotation thereof in the opposite direction to cause said roller to rotate said supply reel in the direction to rewind said tape and leader thereon.

15. Tape transport mechanism comprising means for operatively supporting a supply reel comprising a central hub and spaced circular side flanges, on the hub of which is wound a tape having a relatively stiff free end leader portion having a width greater than the spacing between said supply reel flanges and wound on the circular periphery of the flanges, a driven take-up reel, guiding means defining a predetermined path between an operatively supported supply reel and said take-up reel, a drive-out-rewind roller mounted adjacent said supply reel supporting means for pressure contact frictional driving engagement with said leader portion while the portion is wound on said flange periphery of an operatively supported supply reel, releasable forward drive means for said roller operative to cause said roller to push a wound leader off a supply reel along said path toward the take-up reel in a threading operation, and releasable rewind drive means for said roller to cause said roller to engage said flange periphery and to rotate the supply reel in a direction to rewind the tape.

16. Tape transport mechanism comprising means for operatively supporting a supply reel on which is wound a tape having a relatively stiff leader portion, a driven take-up reel, guiding means defining a predetermined path between an operatively supported supply reel and said take-up reel, a drive-out-rewind and brake roller movable between an operative position engageable with an operatively supported supply reel and a retracted position, releasable forward drive means engageable with said roller when the roller is in operative position for rotation thereof in a direction to push a wound leader off a supply reel and along said path toward the take-up reel in a threading operation, releasable rewind drive means engagable with said roller when the roller is in operative position for rotation of the roller in the opposite direction to rotate the supply reel for rewinding the tape, and means operative when said roller is not engaged by either of said drive means to move said roller into operative position to brake said supply reel.

17. In a tape transport mechanism having means for operatively supporting a supply reel on which is wound a tape having a relatively stiff free end leader portion, a take-up reel having a hub portion and a pair of parallel said flanges, and guiding means defining a predetermined path between an operatively supported supply reel and said take-up reel, the combination of:

a drive-out-rewind roller mounted adjacent said supply reel supporting means and engageable with said leader portion while the portion is wound on an operatively supported supply reel, releasable forward drive means for said roller operative to cause said roller to push a wound leader off a supply reel along said path at a predetermined velocity toward the take-up reel in a threading operation, means provided for the flanges of the take-up reel to frictionally grasp the edges of the leader when it reaches the take-up reel, means for rotating the take-up reel at a rate at which the velocity of the hub surface exceeds said predetermined velocity of the leader in the threading operation to cause winding of the leader on the hub hub of the take-up reel, and releasable rewind drive means for said roller to cause the roller to engage on operatively supported supply reel to rotate the reel in a direction to rewind said tape.

References Cited in the file of this patent

UNITED STATES PATENTS

| | | |
|---|---|---|
| 2,546,146 | Popoli | Mar. 27, 1951 |
| 2,679,362 | Thalhammer | May 25, 1954 |
| 2,838,305 | Hoehn et al. | June 10, 1958 |
| 2,854,526 | Morgan | Sept. 30, 1958 |
| 2,868,471 | Klein | Jan. 13, 1959 |
| 2,912,179 | Schuyler | Nov. 10, 1959 |
| 2,963,555 | Brubaker | Dec. 6, 1960 |
| 2,969,929 | Rudzitis | Jan. 311, 1961 |
| 2,986,318 | Tiger | May 30, 1961 |
| 3,004,729 | Barkhuff | Oct. 17, 1961 |
| 3,006,650 | Ellmore | Oct. 31, 1961 |
| 3,078,464 | Lyon et al. | Feb. 19, 1963 |

Disclaimer 3,149,797.—*Sheldon Lee Pastor*, Chicago, *Carl W. Claras*, Western Springs, *Robert L. Moore*, La Grange Highlands, *Rudolph A. Rom*, Berwyn, and *Myron Zarr*, Chicago, Ill. SELF-THREADING MAGNETIC TAPE RECORDING AND REPRODUCING APPARATUS. Patent dated Sept. 22, 1964. Disclaimer filed Sept. 29, 1972, by the assignee, *Minnesota Mining and Manufacturing Company*, consenting.

Hereby enters this disclaimer to claims 1, 2 and 4 of said patent.

[*Official Gazette December 26, 1972.*]